US010884391B2

(12) United States Patent
Oonishi

(10) Patent No.: US 10,884,391 B2
(45) Date of Patent: Jan. 5, 2021

(54) POSITIONAL INFORMATION DISPLAY SYSTEM

(71) Applicant: FANUC CORPORATION, Yamanashi (JP)

(72) Inventor: Nobuhito Oonishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/429,233

(22) Filed: Jun. 3, 2019

(65) Prior Publication Data

US 2019/0369592 A1   Dec. 5, 2019

(30) Foreign Application Priority Data

Jun. 5, 2018  (JP) .................. 2018-107950

(51) Int. Cl.
   *G05B 19/402*      (2006.01)
   *G06F 3/041*       (2006.01)
   (Continued)

(52) U.S. Cl.
   CPC ........... *G05B 19/402* (2013.01); *G06F 3/041* (2013.01); *G06F 3/0481* (2013.01);
   (Continued)

(58) Field of Classification Search
   CPC .................................................. G05B 19/402
   See application file for complete search history.

(56) References Cited

U.S. PATENT DOCUMENTS

2018/0024525 A1* 1/2018 Inoue ................... G05B 19/402
                                                            700/193

FOREIGN PATENT DOCUMENTS

JP   1-133131      5/1989
JP   2004-243454   9/2004
(Continued)

OTHER PUBLICATIONS

Hirokazu Kato, et al., "An Augmented Reality System and its Calibration based on Marker Tracking", TVRSJ, vol. 4, No. 4, Jul. 1999 (with concise explanation of relevancy and English abstract).
(Continued)

*Primary Examiner* — Robin J Mishler
(74) *Attorney, Agent, or Firm* — Wenderoth, Lind & Ponack, L.L.P.

(57) ABSTRACT

A positional information display system includes a control device, a conversion information calculation device and an image information control device, in which the conversion information calculation device has a conversion information calculation portion which calculates conversion information representing a position and/or posture of a first coordinate system on a second coordinate system with a coordinate value of each axis of an industrial machine as a variable; and the image information control device has a coordinate information conversion portion which calculates a position and/or posture on the second coordinate system using conversion information and a coordinate value of each axis; a positional information calculation data setting portion which sets calculation data of positional information for visually displaying the position and/or posture in the first coordinate system by the third coordinate system of a display device; and a positional information display data calculation portion which calculates display data of the positional information.

8 Claims, 37 Drawing Sheets

(51) Int. Cl.
  *G06F 3/14*      (2006.01)
  *G06F 3/0484*    (2013.01)
  *G06F 3/0481*    (2013.01)
  *G06F 3/0488*    (2013.01)
  *G06T 7/70*      (2017.01)

(52) U.S. Cl.
  CPC ........ *G06F 3/0488* (2013.01); *G06F 3/04842* (2013.01); *G06F 3/14* (2013.01); *G05B 2219/32128* (2013.01); *G05B 2219/42249* (2013.01); *G06T 7/70* (2017.01); *G06T 2207/30204* (2013.01)

(56) References Cited

FOREIGN PATENT DOCUMENTS

| | | |
|---|---|---|
| JP | 2008-272877 | 11/2008 |
| JP | 2016-157400 | 9/2016 |
| JP | 2016-209937 | 12/2016 |

OTHER PUBLICATIONS

Notification of Reasons for Refusal dated Aug. 25, 2020 in Japanese Application No. 2018-107950.

\* cited by examiner

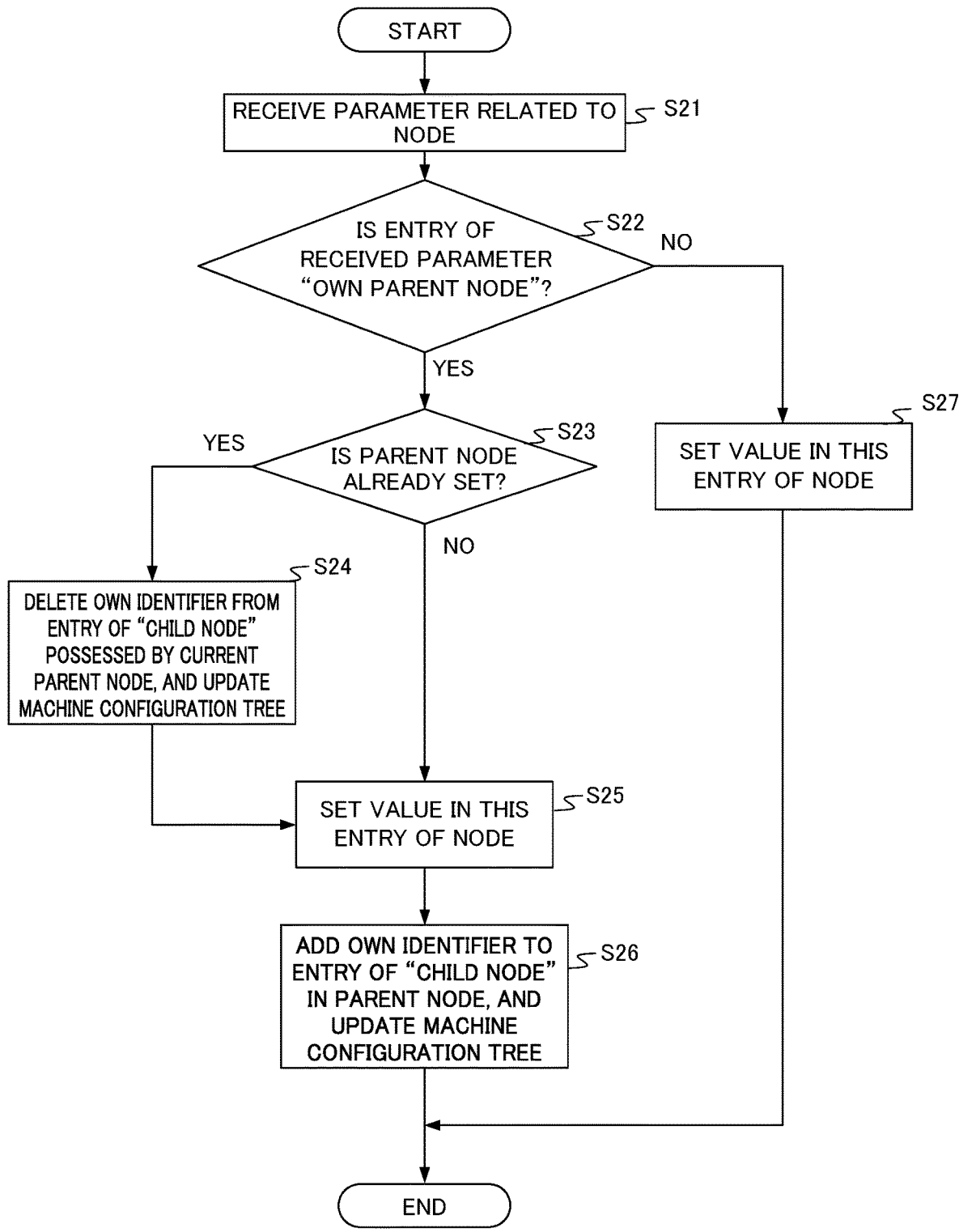

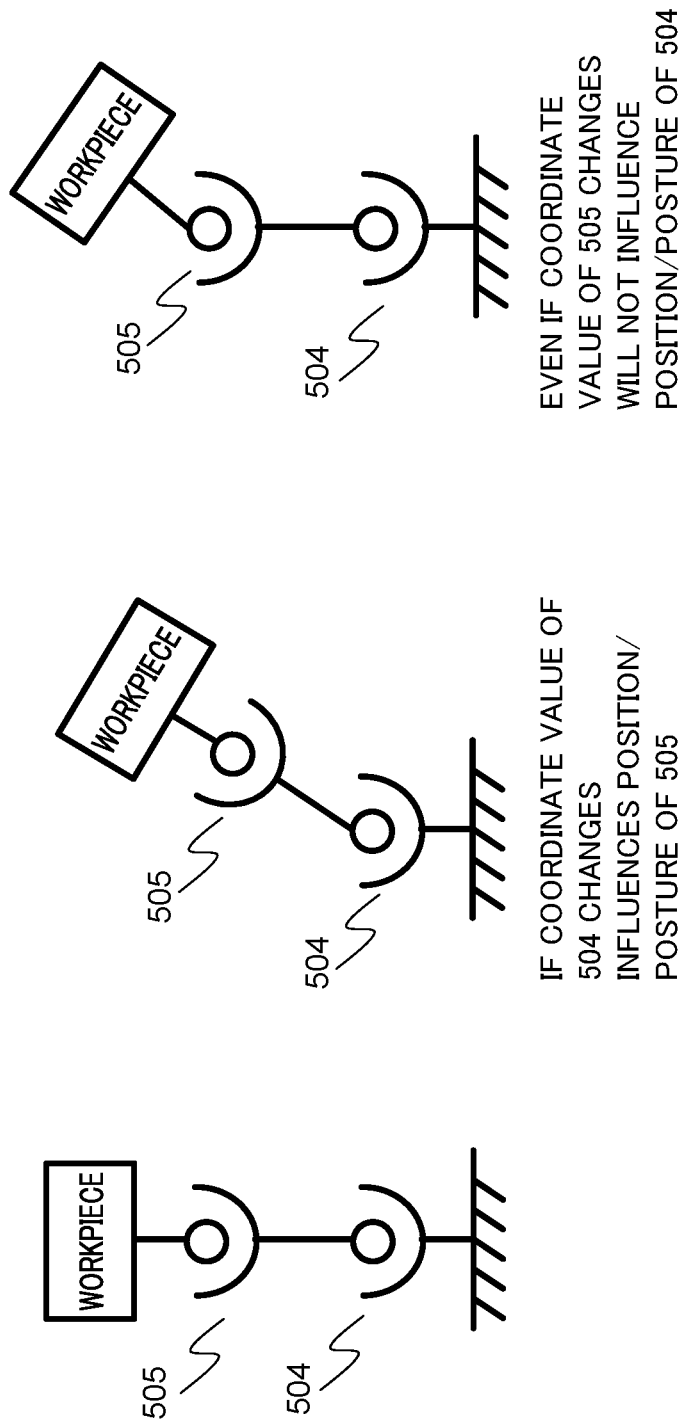

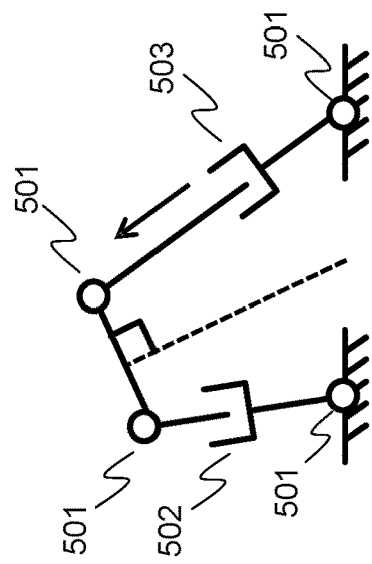
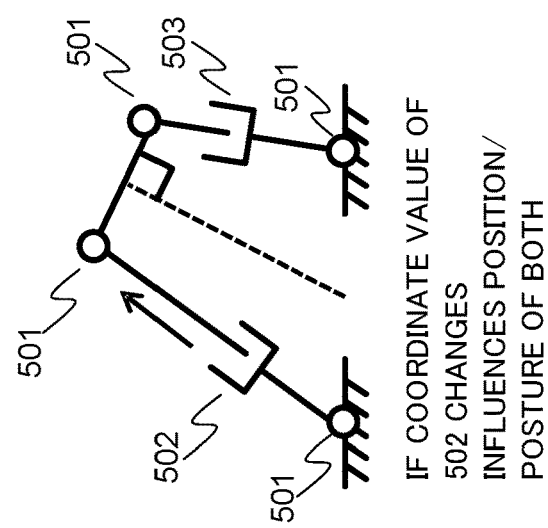
FIG. 11B
IF COORDINATE VALUE OF 502 CHANGES INFLUENCES POSITION/ POSTURE OF BOTH
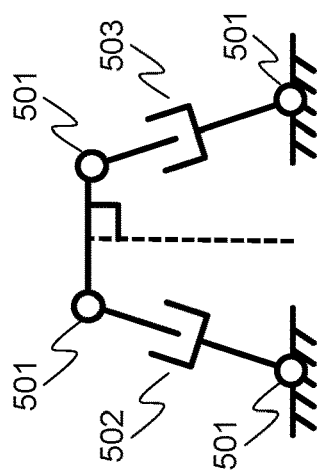

FIG. 13
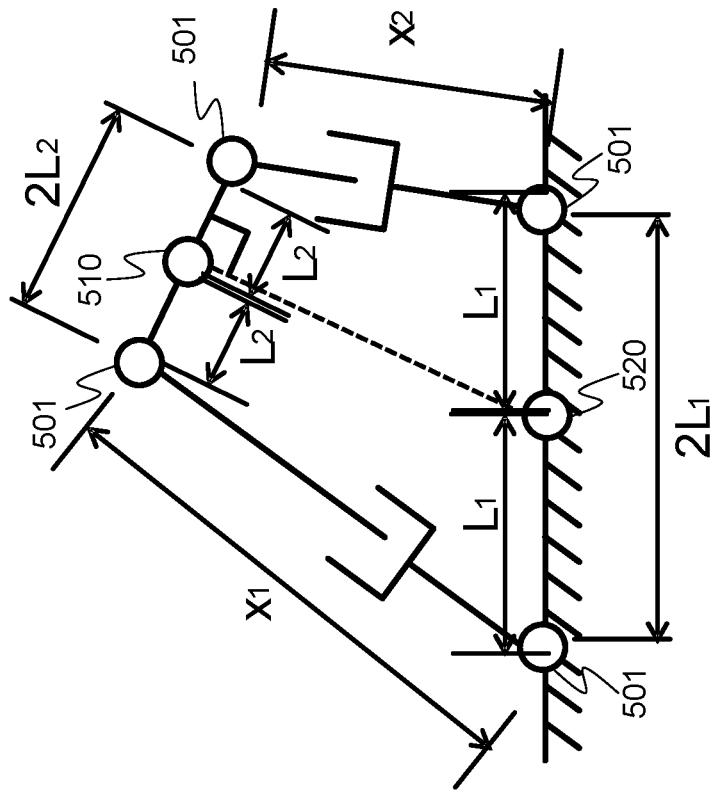
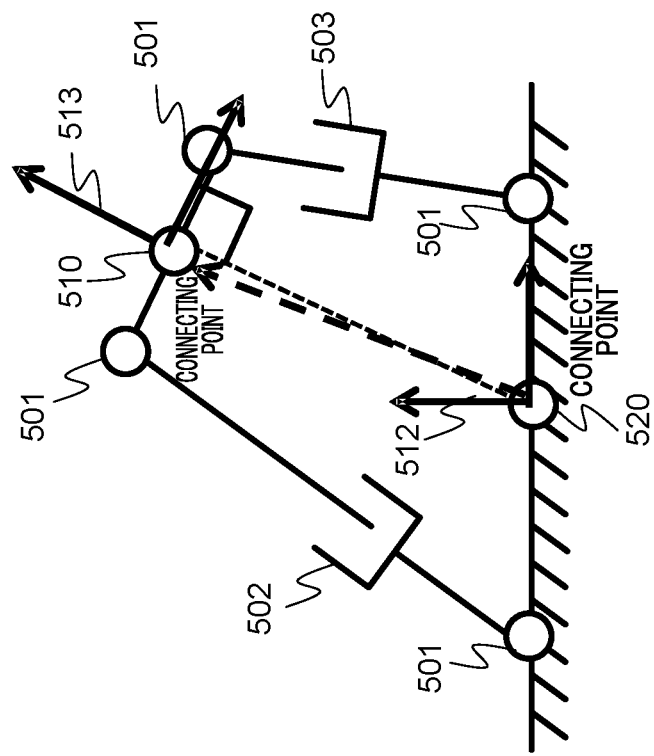
512 : HOMOGENOUS MATRIX $M_A$ REPRESENTING
POSITION POSTURE OF CONNECTING POINT 520
513 : HOMOGENOUS MATRIX $M_B$ REPRESENTING
POSITION POSTURE OF CONNECTING POINT 510

MACHINE CONFIGURATION

MACHINE ORIGIN

MACHINE CONFIGURATION TREE

MACHINE CONFIGURATION TREE

MACHINE CONFIGURATION TREE

MACHINE CONFIGURATION TREE

POSITIONAL INFORMATION DISPLAY SYSTEM

This application is based on and claims the benefit of priority from Japanese Patent Application No. 2018-107950, filed on 5 Jun. 2018, the content of which is incorporated herein by reference.

BACKGROUND OF THE INVENTION

Field of the Invention

The present invention is related to a positional information display system.

Related Art

As a method of an operator designating positional information relative to a numerical control device, there is a method of inputting coordinate values using MDI keys, etc. equipped to the numerical control device. In the case of manipulating an axis by manual operation, the movement destination, etc. of the axis are taught to the numerical control device by inputting the coordinate values according to numerical commands by MDI running or manually. However, with the method of inputting direct numerical values, it is not easy to use due to not being an intuitive operation.

For this reason, as a method of operating an axis without designating positional information, there are methods of jog feeding, handle feeding, etc. In these methods, intuitive operation is possible by confirming the machining area of a machine tool and the coordinate values displayed on a screen of the numerical control device.

However, there are problems in the point of requiring to alternately confirm the machining area and numerical operation screen, point of not being able to operate in the case of the machining area being distanced in the first place, etc.

In relation to this problem, Patent Document 1 proposes axis operation by way of a touch operation on a touch panel displaying a camera image which is capturing inside of a machine.

Patent Document 1: Japanese Unexamined Patent Application, Publication No. 2016-157400

Non-Patent Document 1: "An Augmented Reality System and Its Calibration based on Marker Tracking, (online), (searched 2018/11/27), Internet <URL:http://intron.kz.t-sukuba.ac.jp/tvrsj/4.4/kato/p-99_VRSJ4_4.pdf>

SUMMARY OF THE INVENTION

According to the technology disclosed in Patent Document 1, although intuitive operation becomes possible on a touch panel, there are problems in that designating and moving an accurate position is difficult, and operation is not simple such as requiring long pressing upon jog feeding on the screen, for example. In addition, position designation in a coordinate system for which the positional relationship with the camera changes such as the workpiece coordinate system on a machine in which the workpiece moves has not been possible.

The present invention has an object of providing a positional information display system capable of accurate and simple position designation upon controlling an industrial machine.

A positional information display system (for example, the "positional information display system 10" described later) according to a first aspect of the present invention includes: a control device (for example, the "numerical control device 150" described later) of an industrial machine (for example, the "machine tool 400" described later), a conversion information calculation device (for example, the "conversion information calculation device 100" described later) which calculates conversion information between different coordinate systems, and an image information control device (for example, the "image information control device 200" described later) which causes positional information to be displayed on a display device having a touch panel, in which the control device includes: a coordinate information notification portion (for example, the "coordinate information notification portion 161" described later) which notifies of coordinate values of each axis of the industrial machine to the image information control device; the conversion information calculation device includes: a conversion information calculation portion (for example, the "conversion information calculation portion 111" described later) which calculates conversion information representing a position and/or posture of a first coordinate system in a second coordinate system, with coordinate values of each axis of the industrial machine as variables, and a conversion information notification portion (for example, the "conversion information notification portion 112" described later) which notifies the conversion information to the image information control device; the image information control device includes: a coordinate information conversion portion (for example, the "coordinate information conversion portion 211" described later) which calculates a position and/or posture of the first coordinate system in the second coordinate system using the conversion information and the coordinate value of each axis, a positional information calculation data setting portion (for example, the "positional information calculation data setting portion 212" described later) which sets data for calculation of positional information for visually displaying on the touch panel a position and/or posture of the first coordinate system in a third coordinate system of the display device, a positional information display data calculation portion (for example, the "positional information display data calculation portion 213" described later) which calculates data for display of the positional information on the display device using the data for calculation of the positional information, and a positional information display data notification portion (for example, the "positional information display data notification portion 214" described later) which notifies of the data for display of the positional information to the display device.

According to a second aspect of the present invention, in the positional information display system as described in the first aspect, the positional information may include a grid; the positional information calculation data setting portion may include: a grid line designation portion (for example, the "grid line designation portion 212a" described later) which designates lines of the grid displayed on the display device based on input from the touch panel, and a grid interval designation portion (for example, the "grid interval designation portion 212b" described later) which designates an interval of the grid displayed on the display device based on input from the touch panel, and the positional information calculation data setting portion may set, as data for calculating the positional information, a line designated by the grid line designation portion, and an interval designated by the grid interval designation portion.

According to a third aspect of the present invention, in the positional information display system as described in the second aspect, the image information control device may include: an on-screen position determination portion (for example, the on-screen position determination portion 215" described later) which determines a position touched by an operator on the touch panel; a grid intersection-point determination portion (for example, the "grid intersection-point determination portion 216" described later) which determines, among intersection points of a grid included in the positional information, an intersection point closest to the position touched by the operator on the touch panel; a coordinate value conversion portion (for example, the "coordinate value conversion portion 217" described later) which calculates a coordinate value in the first coordinate system of the intersection point; and a coordinate value notification portion (for example, the "coordinate value notification portion 218" described later) which notifies the coordinate value to the control device.

According to a fourth aspect of the present invention, in the positional information display system as described in the first aspect, the positional information may include dots; the positional information calculation data setting portion may include a dot interval designation portion (for example, the "dot interval designation portion 212c" described later) which designates an interval of the dots displayed on the display device based on input from the touch panel; and the positional information calculation data setting portion may set, as data for calculating the positional information, an interval designated by the dot interval designation portion.

According to a fifth aspect of the present invention, in the positional information display system as described in the fourth aspect, the image information control device may include: an on-screen position determination portion which determines a position touched by an operator on the touch panel; a touched dot determination portion (for example, the "touched dot determination portion 216c" described later) which determines, among dots included in the positional information, a touched dot which is a dot closest to the position touched by the operator; a coordinate value conversion portion which calculates a coordinate value in the first coordinate system of the touched dot; and a coordinate value notification portion which notifies of the coordinate value to the control device.

According to a sixth aspect of the present invention, in the positional information display system as described in the third and fifth aspects, the coordinate value notification portion may notify of the coordinate value to the display device, and the display device may display a notified coordinate value.

According to a seventh aspect of the present invention, in the positional information display system as described in any one of the first to sixth aspects, the conversion information calculation device may include: a graph generation portion (for example, the "graph generation portion 113" described later) which generates a graph constituted by nodes showing a machine configuration of the industrial machine; a control point coordinate system insertion portion (for example, the "control point coordinate system insertion portion 114" described later) which inserts a control point and coordinate system into the graph; and a node information notification portion (for example, the "node information notification portion 115" described later) which notifies of node information which can be selected as a coordinate system to the image information control device, in which the image information control device may include: a node selection portion (for example, the "node selection portion 219" described later) which selects a node corresponding to the coordinate system displayed; and a selected node notification portion (for example, the "selected node notification portion 220" described later) which notifies of a selected node to the conversion information calculation portion of the conversion information calculation device, in which the conversion information calculation portion may calculate conversion information which represents the position and/or posture in a coordinate system corresponding to a selected node.

According to an eighth aspect of the present invention, in the positional information display system as described in the seventh aspect, a node corresponding to a camera may be included in a graph generated by the graph generation portion, and the conversion information may include a coordinate value of a control axis node on a pathway of the graph from the node corresponding to the camera to a node of a display target, as a variable, and is conversion information calculating a position and/or posture of each node of the display target on the camera coordinate system based on the graph.

According to a ninth aspect of the present invention, in the positional information display system as described in the seventh aspect, a node corresponding to a marker may be included in a graph generated by the graph generation portion, and the conversion information may include a coordinate value of a control axis node on a pathway of the graph from a node corresponding to a marker to a node of the display target as a variable, and is conversion information calculating a position and/or posture of each node of the display target on the marker coordinate system, based on the graph.

According to the present invention, it is made possible to provide a positional information display system capable of accurate and simple position designation upon controlling an industrial machine.

BRIEF DESCRIPTION OF THE DRAWINGS

FIG. 10 is a flowchart showing a generation method of a machine configuration tree in the second embodiment of the present invention;

FIG. 11A is an explanatory drawing of a parent-child relationship of constitutional elements of a machine in the second embodiment of the present invention;

FIG. 11B is an explanatory drawing of a parent-child relationship of constituent elements of a machine in the second embodiment of the present invention;

FIG. 13 is a view showing an example of a machine configuration according to the second embodiment of the present invention;

DETAILED DESCRIPTION OF THE INVENTION

Figure 1:
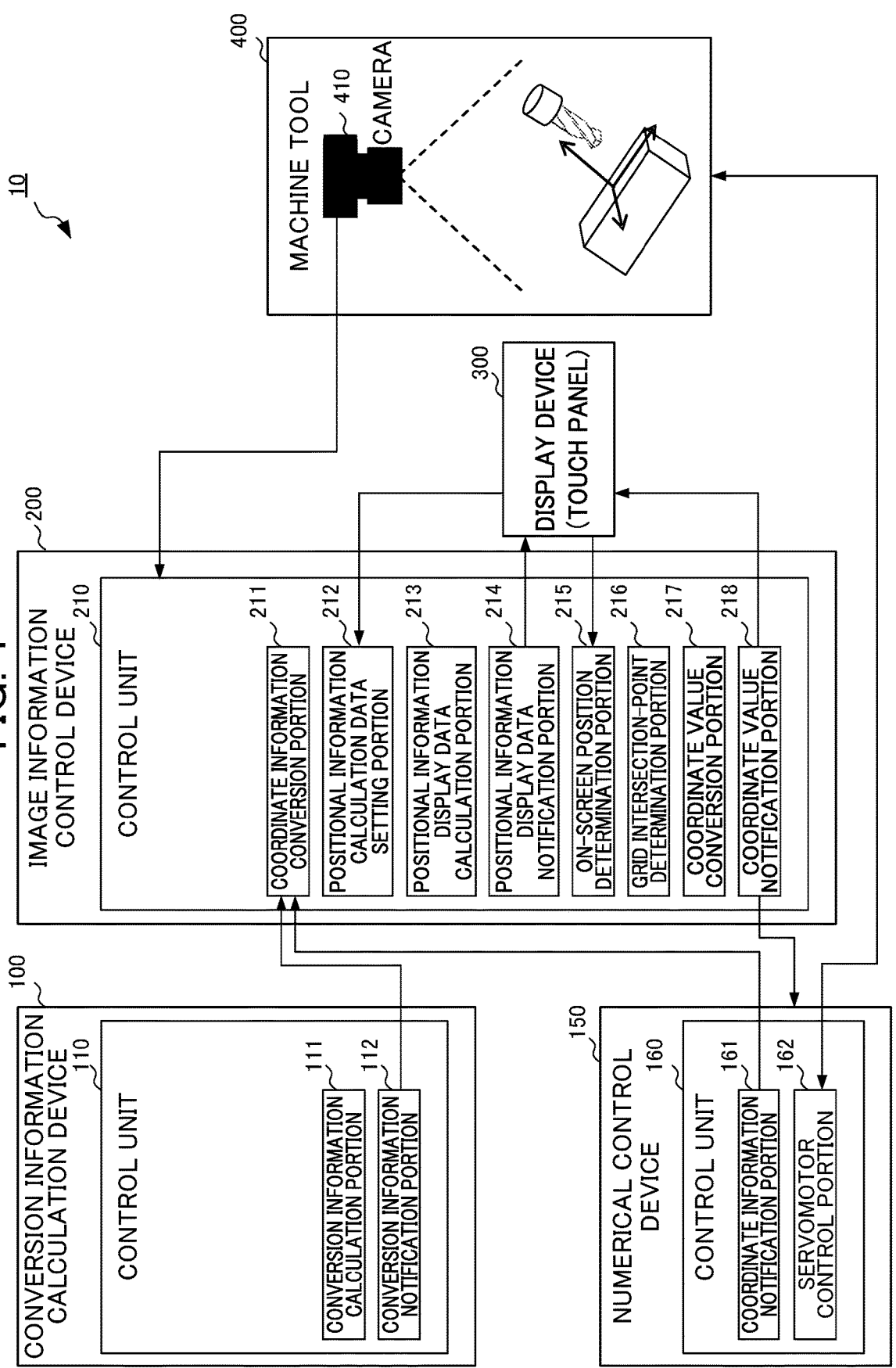
FIG. 1 is a view showing the overall configuration of a positional information display system according to a first embodiment of the present invention.

1 First Embodiment 1.1 Configuration of Positional Information Display System

Next, a first embodiment of the present invention will be explained in detail by referencing the drawings. First, an explanation will be made for the overall configuration of the present embodiment by referencing FIG. 1.

A positional information display system 10 according to the present embodiment includes a conversion information calculation device 100, numerical control device 150, image information control device 200, display device 300 and machine tool 400.

The conversion information calculation device 100 calculates conversion information representing the position and/or posture of a workpiece, tool or the like in the machine tool 400, in a camera coordinate system with the coordinate value of each axis of the machine tool 400 as a variable, and notifies to the image information control device 200. The conversion information calculation device 100 may calculate a conversion matrix, for example, as this conversion information. The detailed configuration of the conversion information calculation device 100 is described later in <1.2 Configuration of conversion information calculation device> below.

The numerical control device 150 includes the functions of a general numerical control device, and is communicably connected with the machine tool 400. Then, the numerical control device 150 controls machines the workpiece by controlling the machine tool 400 according to the movement amount of each control axis outputted based on a machining program incorporated in the numerical control device 150 itself.

In addition, the numerical control device 150 outputs coordinate values of each control axis outputted based on the machining program to the image information control device 200. The detailed configuration of the numerical control device 150 is described in <1.3 Configuration of numerical control device> below.

The image information control device 200 performs control for displaying positional information on a display device 300 described later, by calculating the display position and display posture of positional information including the coordinate system and grid. The detailed configuration of the image information control device 200 is described in <1.4 Configuration of image information control device> below.

The display device 300 is a general display device having a touch panel, and acquires positional information including the coordinate system and grid, and display position and display posture thereof from the image information control device 200. Then, based on this acquired information, the positional information is displayed on the touch panel serving as the screen surface possessed by the display device 300 itself. This acquired information is information corresponding to the camera coordinate system with the camera 410 equipped to the machine tool 400 described later as the standard. In addition, a touch panel is equipped to the display device 300, and the grid lines, interval of grid, touch position on the grid, etc. indicated by the input values from the touch panel by the operator, etc. are outputted to the image information control device 200.

The machine tool 400 is a general machine tool, and causes each control axis to move/rotate in response to the movement amount of each control axis outputted from the numerical control device 150. The machine tool 400 may be a lathe, milling machine, electrical discharge machine, grinding machine, machining center, laser processing machine or the like.

In addition, the machine tool 400 includes the camera 410, and outputs the information acquired by photography to the image information control device 200.

In the present embodiment, according to such a configuration, it becomes possible for the grid to be drawn on the touch panel serving as the screen surface of the display device 300, the operator to select a drawn grid line, and the operator to input the grid interval. Furthermore, it becomes possible to display the coordinate value of the grid intersection point closest to the position touched by the operator on the touch panel of the display device 300, and notify this coordinate value to the numerical control device 150 from the image information control device 200. It is thereby made possible for the operator to intuitively designate an accurate position of the workpiece and/or tool.

It should be noted that the configuration shown in FIG. 1 is ultimately only an example. For example, the display device 300 may be integrated to be incorporated in the numerical control device 150, or may be configured so as to be realized by a tablet-type terminal. In addition, it may be configured to build-in part or the entirety of the functions of the conversion information calculation device 100 into the numerical control device 150 or image information control device 200. In addition, it may be configured to build-in part or the entirety of the functions of the image information control device 200 into the numerical control device 150 or display device 300. In addition, the image information control device 200 may be realized by an individual device, or may be realized by a combination of a plurality of devices. In addition, the image information control device 200 may be realized by a device installed in the vicinity of the numerical control device 150 or machine tool 400, or may be realized by a server device or the like installed at a long distance via a network with the numerical control device 150 and machine tool 400. Furthermore, each communication connection may be a wired connection or wireless connection. For example, the drawings illustrate examples in which the communication connections of the conversion information calculation device 100, numerical control device 150 and image information control device 200 are carried out by wired connections conforming to Ethernet (Ethernet (registered trademark)); however, these connections may be wireless connections.

1.2 Configuration of Conversion Information Calculation Device

The conversion information calculation device 100 includes a control unit 110, and the control unit 110 includes a conversion information calculation portion 111 and conversion information notification portion 112.

The control unit 110 is a processor which controls the conversion information calculation device 100 overall. This control unit 110 reads out system programs and application programs stored in ROM (not illustrated) via a bus, and realizes the functions of the conversion information calculation portion 111 and conversion information notification portion 112 included by the control unit 110 in accordance with the system program and application program.

The conversion information calculation portion 111 calculates conversion information representing the position and/or posture in the camera coordinate system with the coordinate value of each axis of the machine tool 400 as variables. It should be noted that this conversion information may be matrix form, may be vector form, or may be roll/pitch/yaw form.

The conversion information notification portion 112 notifies conversion information calculated by the conversion information calculation portion 111 to a coordinate information conversion portion 211 of the image information control device 200.

1.3 Configuration of Numerical Control Device

The numerical control device 150 includes a control unit 160, and the control unit 160 includes a coordinate information notification portion 161 and servomotor control portion 162.

The control unit 160 is a processor which controls the numerical control device 160 overall. This control unit 160 reads out a system program and application program stored in ROM (not illustrated) via a bus, and realizes the functions of the coordinate information notification portion 161 and servomotor control portion 162 equipped to the control unit 160, in accordance with the system program and application program.

The coordinate information notification portion 161 notifies the coordinate information in operation to the coordinate information conversion portion 211 of the image information control device 200. This notification may be periodically executed. The servomotor control portion 162 receives the movement command amount of each axis from the control unit 160, and outputs the command of each axis to the servomotor (not illustrated).

It should be noted that the numerical control device 150 also includes other constituent elements included by a general numerical control device, in order to perform numerical control on the machine tool 400; however, explanation thereof will be omitted.

1.4 Configuration of Image Information Control Device

The image information control device 200 includes a control unit 210, and the control unit 210 includes a coordinate information conversion portion 211, positional information calculation data setting portion 212, positional information display data notification portion 214, on-screen position determination portion 215, grid intersection-point determination portion 216, coordinate value conversion portion 217 and coordinate value notification portion 218.

The control unit 210 is a processor which controls the image information control device 200 overall. This control unit 210 reads out a system program and application program stored in ROM (not illustrated), and realizes the functions of the coordinate information conversion portion 211, positional information calculation data setting portion 212, positional information data calculation portion 213, positional information display data notification portion 214, on-screen position determination portion 215, grid intersection-point determination portion 216, coordinate value conversion portion 217 and coordinate value notification portion 218 equipped to the control unit 210 in accordance with the system program and application program.

The coordinate information conversion portion 211 calculates the position and/or posture in the camera coordinate system of the positional information including the coordinate system and grid, from the conversion information received from the conversion information calculation device 100, and coordinate values of each control axis periodically notified from the numerical control device 150. In other words, the coordinate information conversion portion 211 calculates the position and/or posture in the camera coordinate system, from the coordinate values of each control axis notified from the numerical control device 150.

The positional information calculation data setting portion 212 sets calculation data for visually displaying the position and/or posture of positional information including the coordinate system and grid in the camera coordinate system, on the touch panel serving as the screen surface of the display device 300.

Figure 2:
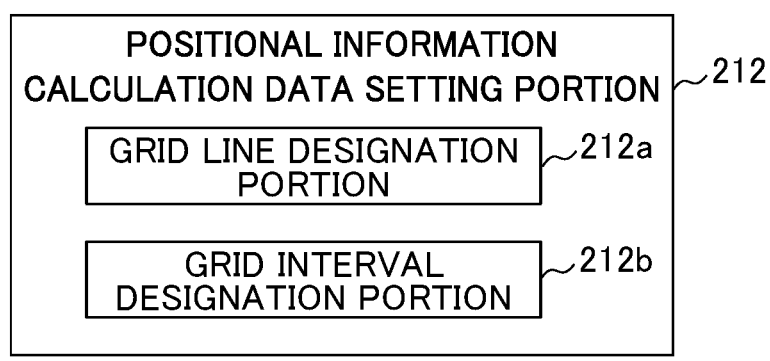
FIG. 2 is a view showing the configuration of a positional information calculation data setting portion included in the positional information display system according to the first embodiment of the present invention.

FIG. 2 shows the configuration of the positional information calculation data setting portion 212. The positional information calculation data setting portion 212 includes a grid-line designation portion 212a and grid-interval designation portion 212b.

The grid-line designation portion 212a designates the lines of the grid displayed on the display device 300, based on the input from the touch panel of the display device 300. More specifically, in the case of the operator selecting a display of the X-Y axis plane, for example, the grid-line designation portion 212a designates the X axis and Y axis. In the case of the operator selecting the display of the Y-Z axis plane, the grid-line designation portion 212a designates the Y-axis and Z-axis. In the case of the operator selecting the display of the X-Z axis plane, the grid-line designation portion 212a designates the X-axis and Z-axis.

The grid-interval designation portion 212b designates the interval of the grid displayed on the display device 300, based on the input from the touch panel of the display device 300.

The positional information display data calculation portion 213 calculates the display data for displaying the coordinate system and grid as positional information drawn on the touch panel serving as the screen surface of the display device 300.

The positional information display data notification portion 214 notifies the display data for displaying the coordinate system and grid as the positional information on the display device 300. In this positional information display data, the form, etc. of the positional information including the coordinate system and grid, and the display position, display posture, etc. converted to the coordinate values of the screen coordinate system of this positional information are included.

The on-screen position determination portion 215 determines the position touched by the operator on the touch panel of the display device 300.

The grid-intersection point determination portion 216 determines the intersection point closest to the position touched by the operator on the touch panel of the display device 300, among the intersection points of the grid included in the positional information displayed on the touch panel serving as the screen surface of the display device 300.

The coordinate value conversion portion 217 calculates the coordinate values in the workpiece coordinate system, of the intersection point determined by the grid-intersection point determination portion 216.

The coordinate value notification portion 218 notifies the coordinate values calculated by the coordinate value conversion portion 217 to the numerical control device 150. Furthermore, the coordinate value notification portion 218 also outputs the above-mentioned coordinate values to the display device 300. The display device 300 displays that the intersection point closest to the position touched by the operator on the grid displayed on the touch panel serving as the screen surface of the display device 300 has the above-mentioned coordinate values.

1.5 Operation of Positional Information Display System

Figure 3A:
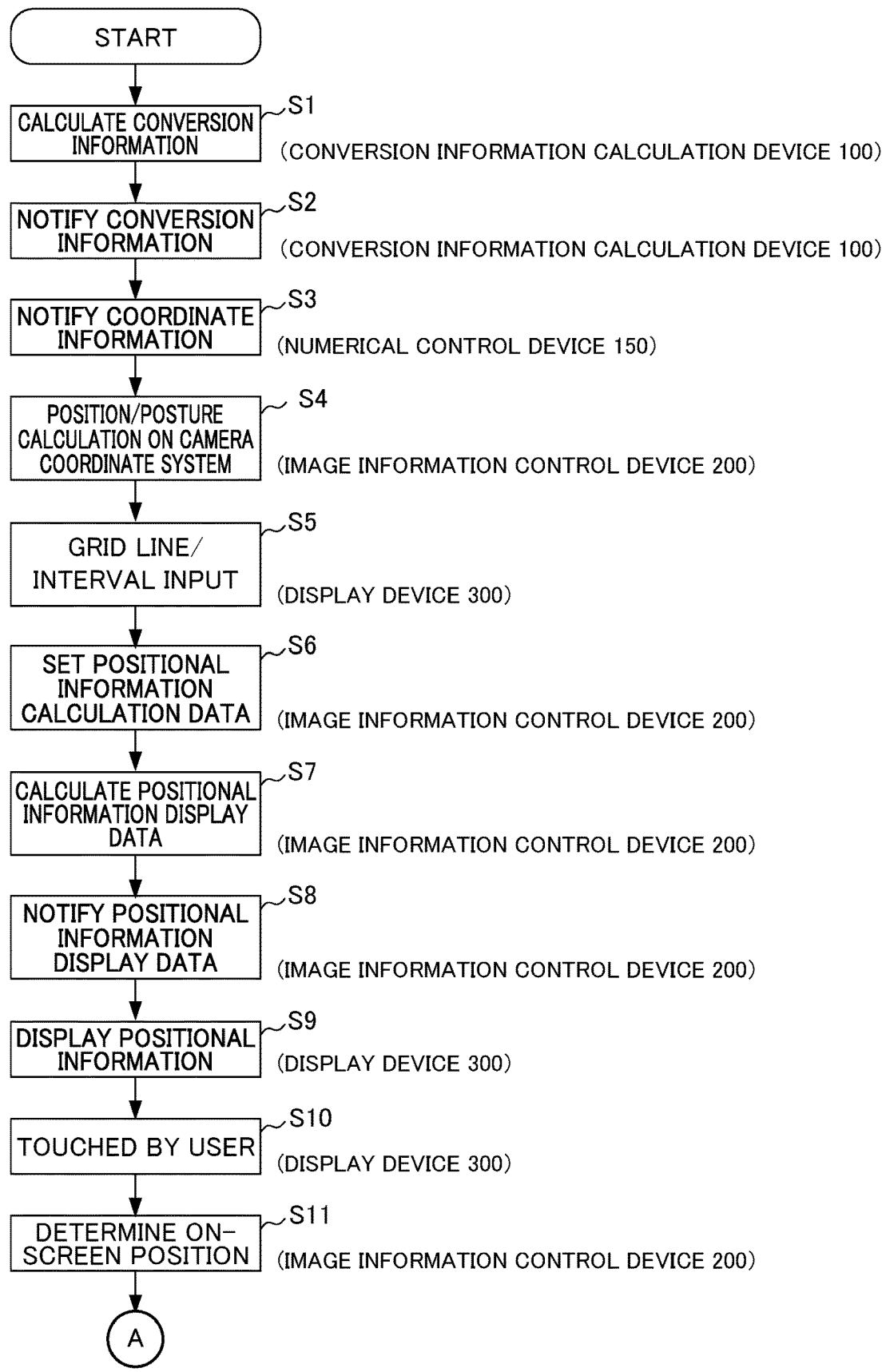
FIG. 3A is a flowchart showing operation of a positional information display system according to the first embodiment of the present invention.
Figure 3B:
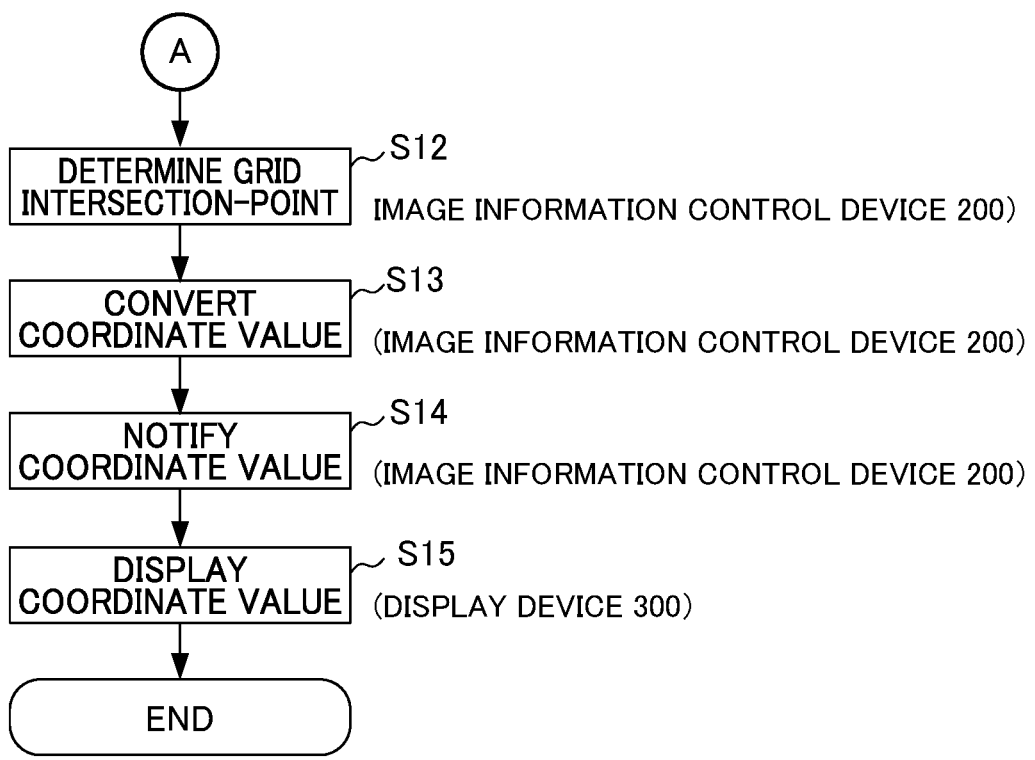
FIG. 3B is a flowchart showing operation of a positional information display system according to the first embodiment of the present invention.

FIG. 3A and FIG. 3B are flowcharts showing the operation of the positional information display system 10.

In Step S1, the conversion information calculation device 100 (conversion information calculation unit 111) calculates the conversion information representing the position and/or posture of positional information in the camera coordinate system, with the coordinate values of each axis of the machine tool 400 as variables.

In Step S2, the conversion information calculation device 100 (conversion information notification portion 112) notifies the conversion information calculated by the conversion information calculation device 100 (conversion information calculation portion 111) to the image information control device 200 (coordinate information conversion portion 211).

In Step S3, the numerical control device 150 (coordinate information notification portion 161) notifies the coordinate information of the machine tool 400 in operation to the image information control device 200 (coordinate information conversion portion 211) in real-time. FIG. 3A shows this notification is executed only once; however, it may be executed periodically.

In Step S4, the image information control device 200 (coordinate information conversion portion 211) calculates the position and/or posture in the camera coordinate system of the positional information including the coordinate system and grid, from the conversion information received from the conversion information calculation device 100, and coordinate values of each control axis periodically notified from the numerical control device 150. In other words, the image information control device 200 (coordinate information conversion portion 211) converts the position and/or posture in the workpiece coordinate system to the position and/or posture in the camera coordinate system.

In Step S5, the operator selects a line of the grid to be displayed from the touch panel of the display device 300, and inputs the interval of the grid lines.

In Step S6, the image information control device 200 (positional information calculation data setting portion 212) sets the calculation data for visually displaying the position and/or posture of the positional information including the coordinate system and grid in the camera coordinate system, on the touch panel serving as the screen surface of the display device 300.

In Step S7, the image information control device 200 (positional information display data calculation portion 213) calculates display data for displaying positional information including the coordinate system and grid drawn on the touch panel serving as the screen surface of the display device 300.

In Step S8, the image information control device 200 (positional information display data notification portion 214) notifies the display data for displaying positional information including the coordinate system and grid to the display device 300.

Figure 4A:
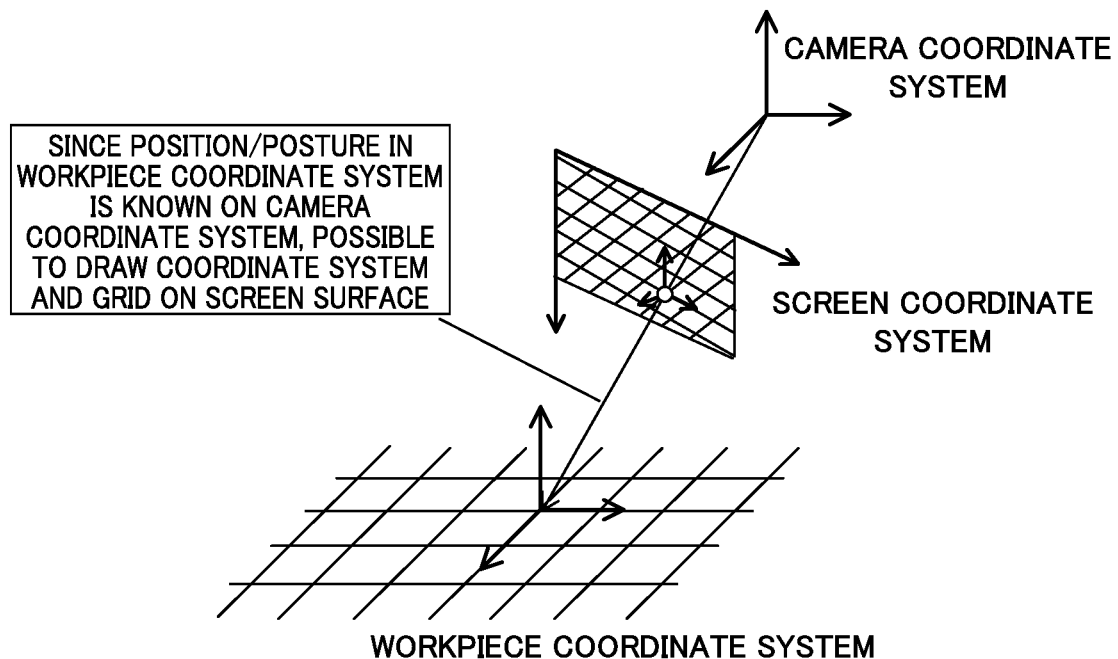
FIG. 4A is a view showing the corresponding relationship of a workpiece coordinate system, camera coordinate system, screen coordination system in a positional display system according to the first embodiment of the present invention.

In Step S9, the display device 300 displays the positional information including the coordinate system and grid, based on the display data acquired from the image information control device 200. FIG. 4A shows an example of a drawing of the coordinate system and grid on the touch panel serving as the screen surface of the display device 300. Since the position/posture in the workpiece coordinate system of the camera coordinate system is known, it becomes possible to draw the positional information including the coordinate system and grid on the touch panel serving as the screen surface.

In Step S10, the operator touches any point on the touch panel included by the display device 300.

In Step S11, the image information control device 200 (on-screen position determination portion 215) determines a position touched by the operator on the touch panel of the display device 300.

In Step S12, the image information control device 200 (grid intersection-point determination portion 216) determines the intersection point closest to the position touched by the operator on the touch panel of the display device 300, among the intersection points of the grid included in the positional information displayed on the touch panel serving as the screen surface of the display device 300.

In Step S13, the image information control device 200 (coordinate value conversion portion 217) calculates coordinate values in the workpiece coordinate system, of intersection points determined by the grid-intersection point determination portion 216).

In Step S14, the image information control device 200 (coordinate value notification portion 218) notifies coordinate values calculated by the image information control device 200 (coordinate value conversion portion 217) to the numerical control device 150 and display device 300.

Figure 4B:
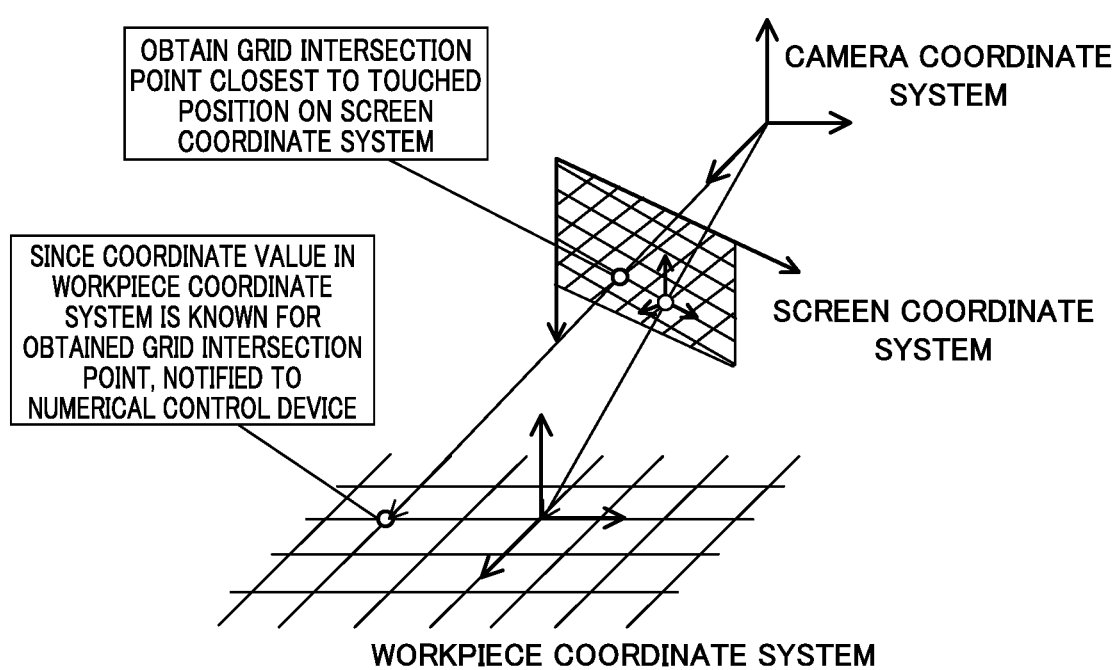
FIG. 4B is a view showing corresponding relationships between a workpiece coordinate system, camera coordinate system, and screen coordinate system in the positional information display system according to the first embodiment of the present invention.

In Step S15, the display device 300 displays that the intersection point closest to the position touched by the operator on the grid displayed on the touch panel serving as the screen surface of the display device 300 has the above-mentioned coordinate value. FIG. 4B shows an example of a grid intersection point on the touch panel serving as the screen surface of the display device 300. The grid intersection point closest to the touch position in the screen coordinate system is obtained and the coordinate value in the workpiece coordinate system of the obtained grid intersection point is known; therefore, it becomes possible to notify this coordinate value to the numerical control device 150.

It should be noted that the sequence of the above-mentioned Steps S1 to S15 can be appropriately switched as needed.

In the above-mentioned Step S4, the image information control device 200 obtains the position/posture in the camera coordinate system from the position/posture in the workpiece coordinate system. More specifically, the image information control device 200 performs processing for obtaining the conversion information from the workpiece coordinate system to the camera coordinate system, and converts the position/posture of positional information including the coordinate system and grid according to this conversion information to the values of the camera coordinate system from the workpiece coordinate system. The positional information display data includes data such as the form of positional information including the coordinate system and grid, in addition to the position/posture of the workpiece coordinate system and camera coordinate system obtained herein. The positional information display data is outputted to the display device 300, and it becomes possible for the display device 300 to draw the positional information including the coordinate system and grid at the appropriate position, using the outputted data.

1.6 Display Example of Positional Information Display System

Figure 5:
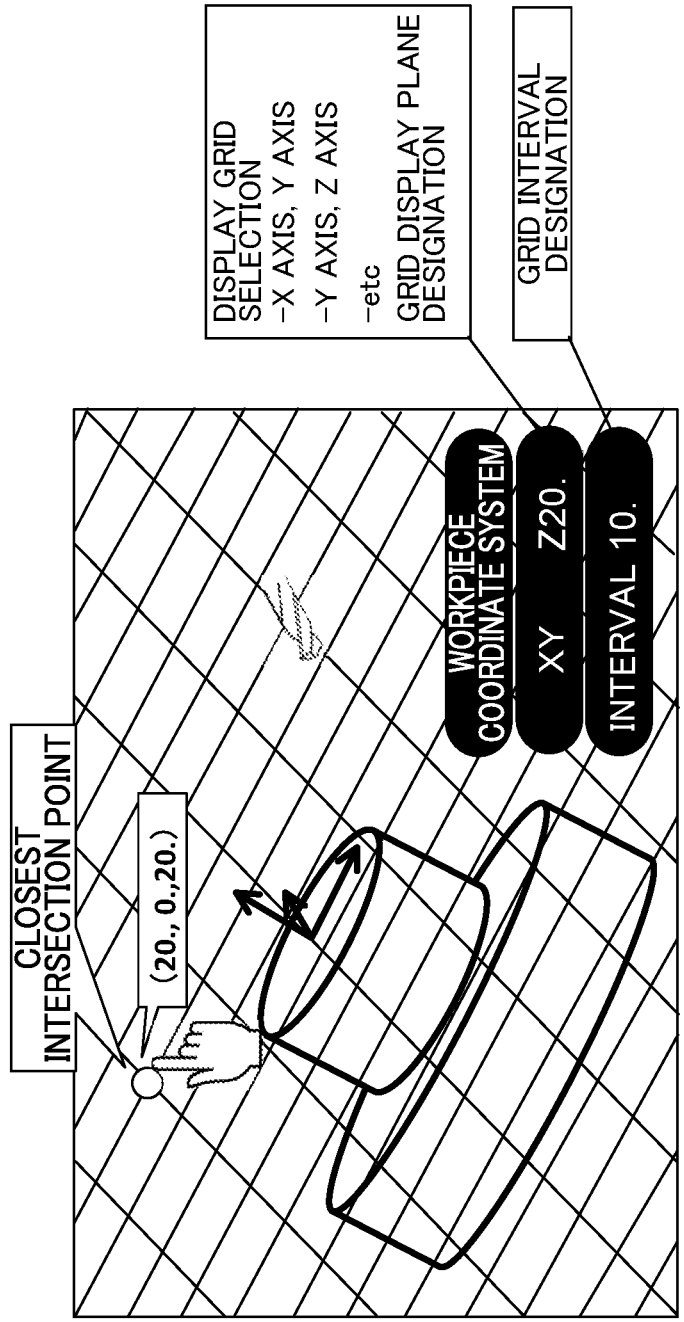
FIG. 5 is a view showing an example of a display screen in the positional information display system according to the first embodiment of the present invention.

FIG. 5 shows an example of the screen display on the display device 300. In the example of FIG. 5, the workpiece is displayed, and the grid of the XY coordinates is displayed in the workpiece coordinate system with the standard of this workpiece. At the bottom right of the screen, it is clarified that the coordinate system currently displayed is the workpiece coordinate system. In addition, according to the display of "XY", it is displayed that the display grid is the "XY coordinate system", and according to the display of "Z20", it is shown which plane of coordinate values is being displayed. In addition, according to the display of "interval 10.", it is shown that the interval of grid lines is 10. It should be noted that, by the operator touching the column of "XY Z20.", it is possible to select the display grid and designate the plane to display. In addition, by the operator touching the column of "interval 10.", it is possible to input the interval of the grid. Furthermore, the top left of the screen displays that the intersection point closest to the point touched by the operator has the coordinate value (−20., 0., 20.).

1.7 Effect Exerted by First Embodiment

In the positional information display system 10 according to the first embodiment, the image information control device 200 includes: the coordinate information conversion portion 211 which uses the conversion information and the coordinate value of each axis of the machine tool to calculate the position and/or posture in the camera coordinate system; a positional information calculation data setting portion 212 which sets the calculation data of positional information for visually displaying the position and/or posture in the screen coordinate system of the display device 300; the positional information display data calculation portion 213 which calculates the display data of positional information on the display device 300; and the positional information display data notification portion 214 which notifies the display data of positional information to the display device 300. It thereby becomes possible to draw the coordinate system and grid on the screen of the display device 300. Consequently, by accurately and simply conducting position designation on the touch panel of the display device 300, it becomes possible to command an accurate coordinate value to the numerical control device by an intuitive operation. In addition, by combining with a manual operation, intuitive and accurate axis operation becomes possible.

In addition, in the positional information display system 10, the positional information calculation data setting portion 212 designates a line of the grid displayed on the display device 300 based on the input from the touch panel, and designates the interval of the grid lines. The operator thereby becomes able to select the grid line to be displayed, and input the grid interval.

In addition, in the positional information display system 10, the image information control device 200 determines the position touched by the operator on the touch panel, determines an intersection point closest to the position touched by the operator among the intersection points of the grid, calculates the coordinate value in the workpiece coordinate system of this intersection point, and notifies the calculated coordinate value to the numerical control device 150. It thereby becomes possible to notify the coordinate value of the grid intersection point closest to the position touched on the touch panel by the operator to the numerical control device 150. Consequently, the numerical control device 150 becomes able to put to use the notified coordinate value such as setting as the movement end point of the manual operation.

2. Second Embodiment

2.1 Configuration of Positional Information Display System

Figure 6:
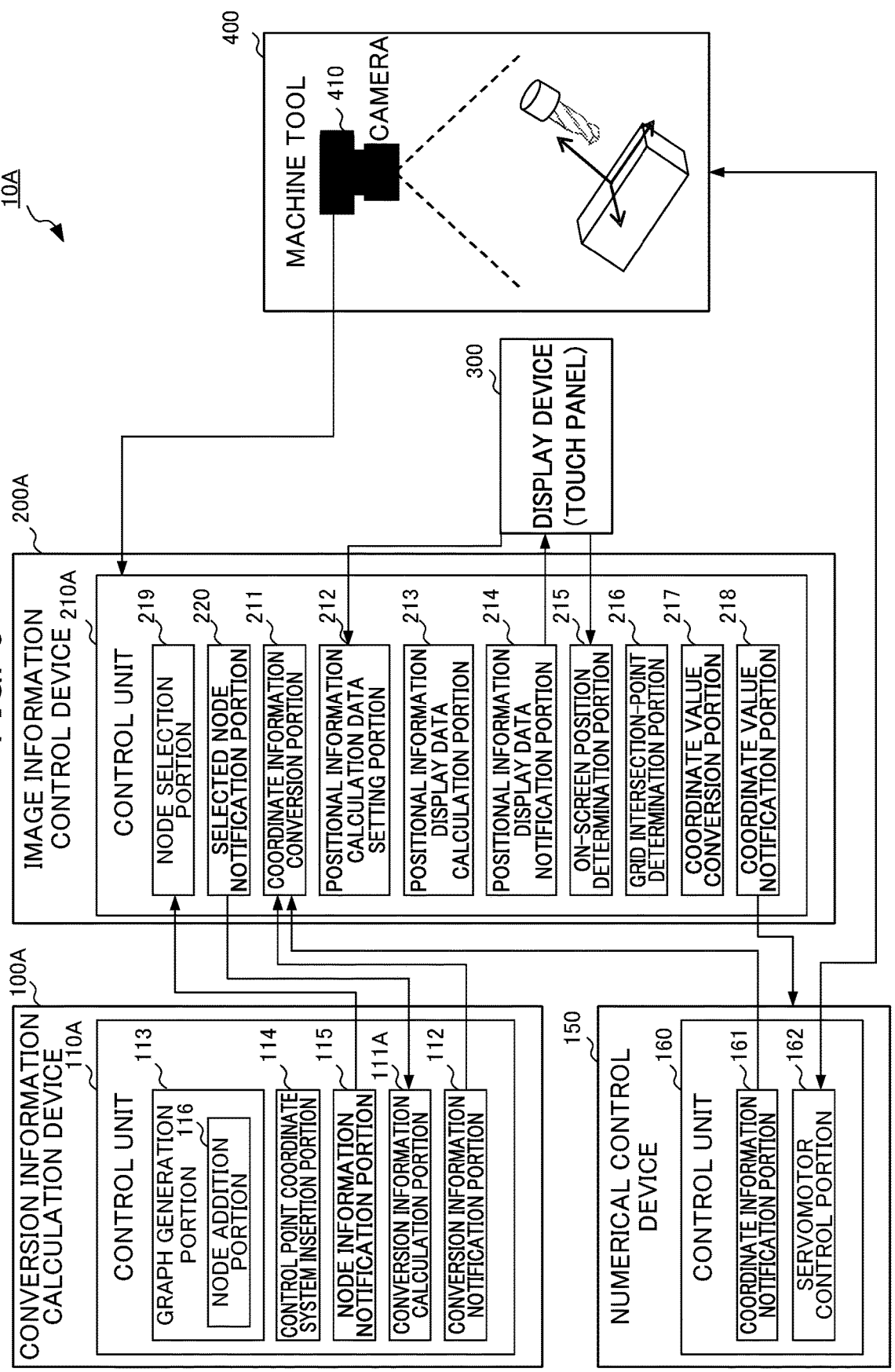
FIG. 6 is a view showing the overall configuration of a positional information display system according to a second embodiment of the present invention.

Next, a second embodiment of the present invention will be explained in detail by referencing the drawings. FIG. 6 shows the overall configuration of the positional information display system 10A according to the second embodiment of the present invention. It should be noted that, hereinafter, among the constituent elements possessed by the positional information display system 10A, constituent elements which are identical to the positional information display system 10 according to the first embodiment are shown using the same reference symbol and explanation thereof is omitted, and the constituent elements differing from the positional information display system 10 will be explained mainly.

It should be noted that the positional information display system 10A according to the second embodiment of the present invention is an embodiment in which the operator can select an arbitrary coordinate system on the touch panel of the display device 300 by using the machine configuration tree described later. In order to realize this function, the positional information display system 10A includes further constituent elements in addition to the constituent elements possessed by the positional information display system 10.

2.2 Configuration of Conversion Information Calculation Device

The conversion information calculation device 100A includes a control unit 110A, and the control unit 110A includes, in addition to the constituent elements possessed by the control unit 110 according to the first embodiment, a graph generation portion 113, control point coordinate system insertion portion 114, node information notification portion 115, and the graph generation portion 113 includes a node addition portion 116. In addition, the control unit 110A includes a conversion information calculation portion 111A in place of the conversion information calculation portion 111.

The graph generation portion 113 generates the machine configuration of the machine tool 400 including the camera 410 in graph format. Furthermore, the node addition portion 116 possessed by the graph generation portion 113 adds nodes to the generated graph. Detailed operations of these are described later in <2.4 Generation of machine configuration tree> below.

The control point coordinate system insertion portion 114 inserts a control point and coordinate system in the graph of the machine configuration. Detailed operation thereof is described later in <2.5 Automatic insertion of control point and coordinate value> below.

The node information notification portion 115 notifies the information of nodes that can be selected as a coordinate system to the image information control device 200A.

The conversion information calculation portion 111A, as described later, calculates conversion information including the coordinate value of a control axis node on the pathway from the camera node to the node of the display target as a variable, which is conversion information for calculating the position and/or posture of the node of each display target in the coordinate system of the camera node, based on the above-mentioned graph, after notifying a node corresponding to the coordinate system displayed on the display device 300 from the selected node notification portion 220 of the image information control device 200A. The specific conversion information calculation method by the conversion information calculation portion 111A is explained in <2.6 Calculation of conversion information> below. It should be noted that the above-mentioned conversion information may be matrix format, may be vector format, or may be roll/pitch/yaw format.

2.3 Configuration of Image Information Control Device

The image information control device 200A includes a control unit 210A, and the control unit 210A includes a node selection portion 219 and selected node notification portion 220 in addition to the constituent elements possessed by the control unit 210 according to the first embodiment.

The node selection portion 219 selects a node corresponding to the coordinate system displayed on the display device 300. The selected node notification portion 220 notifies a node selected by the node selection portion 219 to the conversion information calculation portion 111 of the conversion information calculation device 100A.

It should be noted that the display method of positional information including the coordinate system and grid by the node selection portion 219, selected node notification portion 220, coordinate information conversion portion 211, positional information calculation data setting portion 212, positional information display data calculation portion 213, and positional information display data notification portion 214 is described later in <2.7 Display method of positional information> below.

2.4 Generation of Machine Configuration Tree

The conversion information calculation device 100A according to the embodiment of the present invention first generates a graph representing the machine constitution. The generation method of generating the machine configuration tree as an example of a graph is described later while referencing FIGS. 7 to 13.

Figure 7:
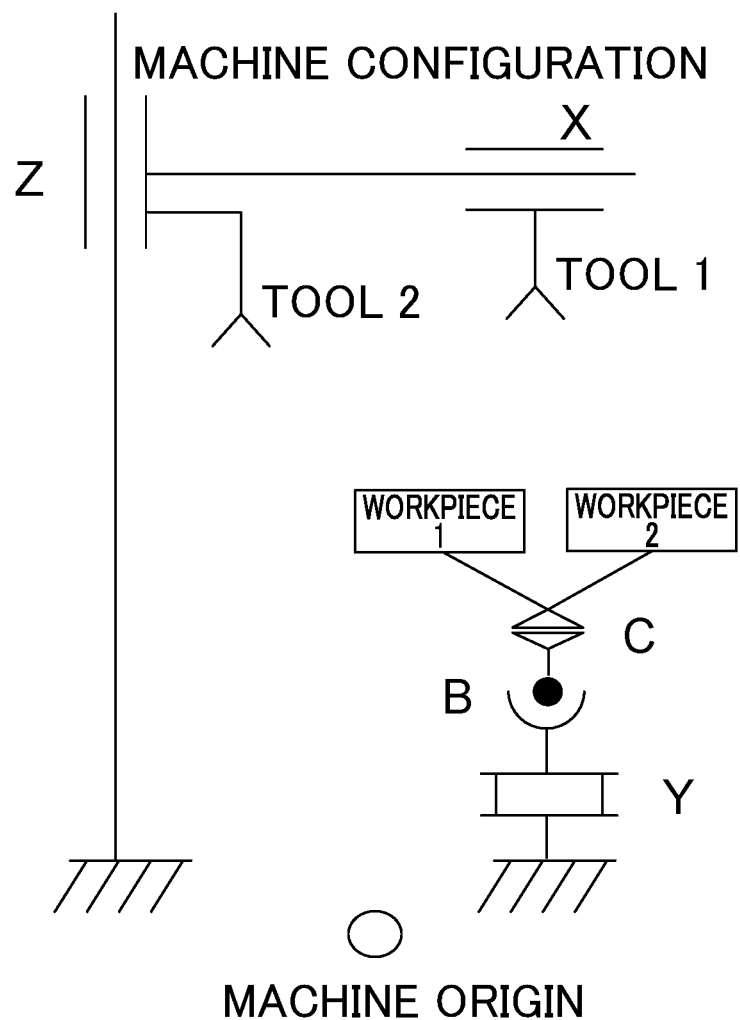
FIG. 7 is an explanatory drawing of a generation method of a machine configuration tree in the second embodiment of the present invention.

As an example, the generation method of the machine configuration tree expressing the configuration of the machine shown in FIG. 7 will be explained. In the machine of FIG. 7, the X axis shall be set as perpendicular to the Z axis, the tool 1 shall be installed on the X axis, and the tool 2 shall be installed on the Z axis. On the other hand, the B axis shall be set on the Y axis, the C axis shall be set on the B axis, and the workpiece 1 and workpiece 2 shall be installed on the C axis. The method of expressing this machine configuration as a machine configuration tree is as follows.

Figure 8:
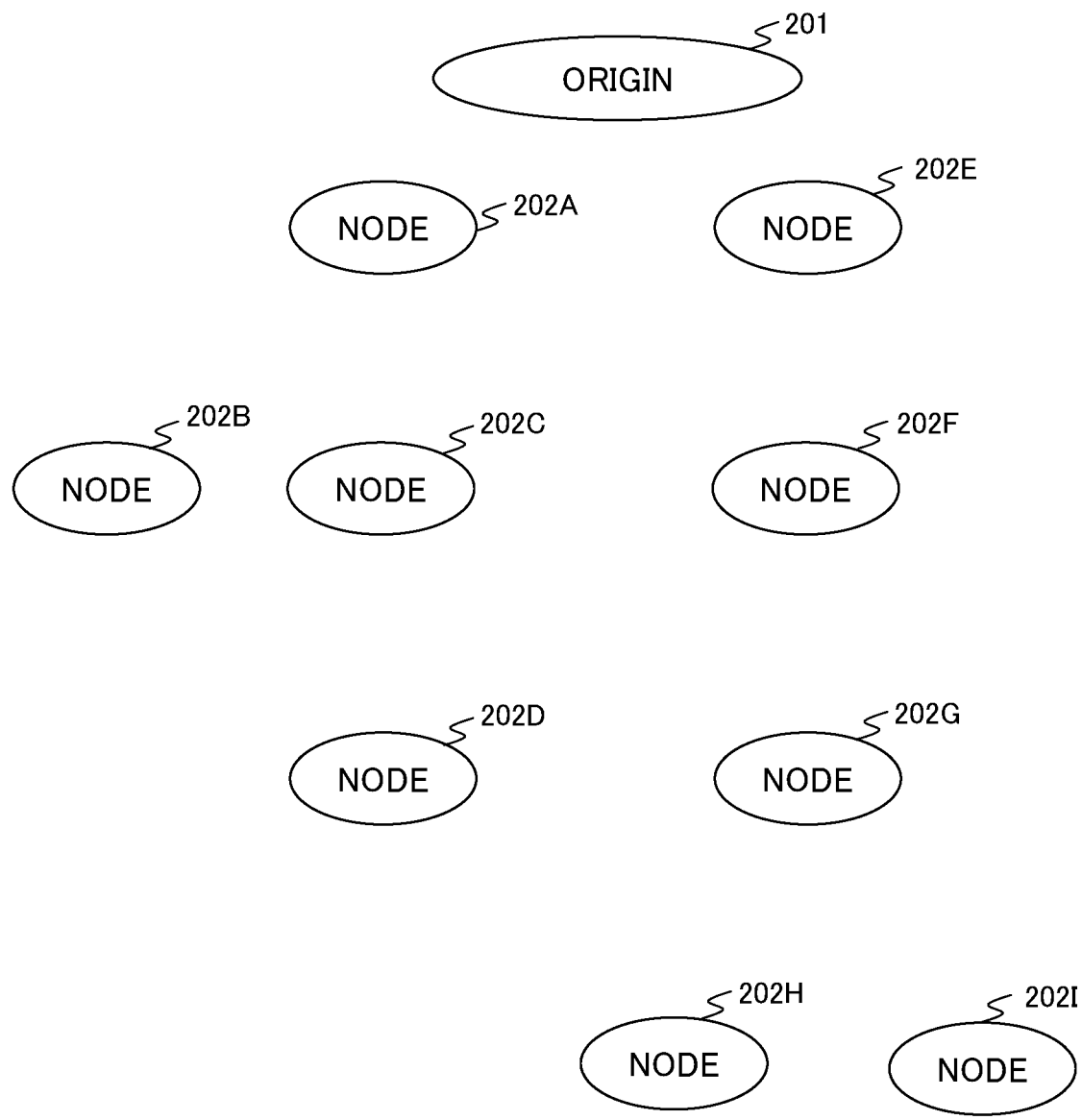
FIG. 8 is an explanatory drawing of a generation method of a machine configuration tree in the second embodiment of the present invention.

First, as shown in FIG. 8, only the origin 201 and nodes 202A to 202I are arranged. At this stage, there is no connection between the origin 201 and node 202, and nodes 202, and the names of each of the origin and nodes are also not set.

Figure 9:
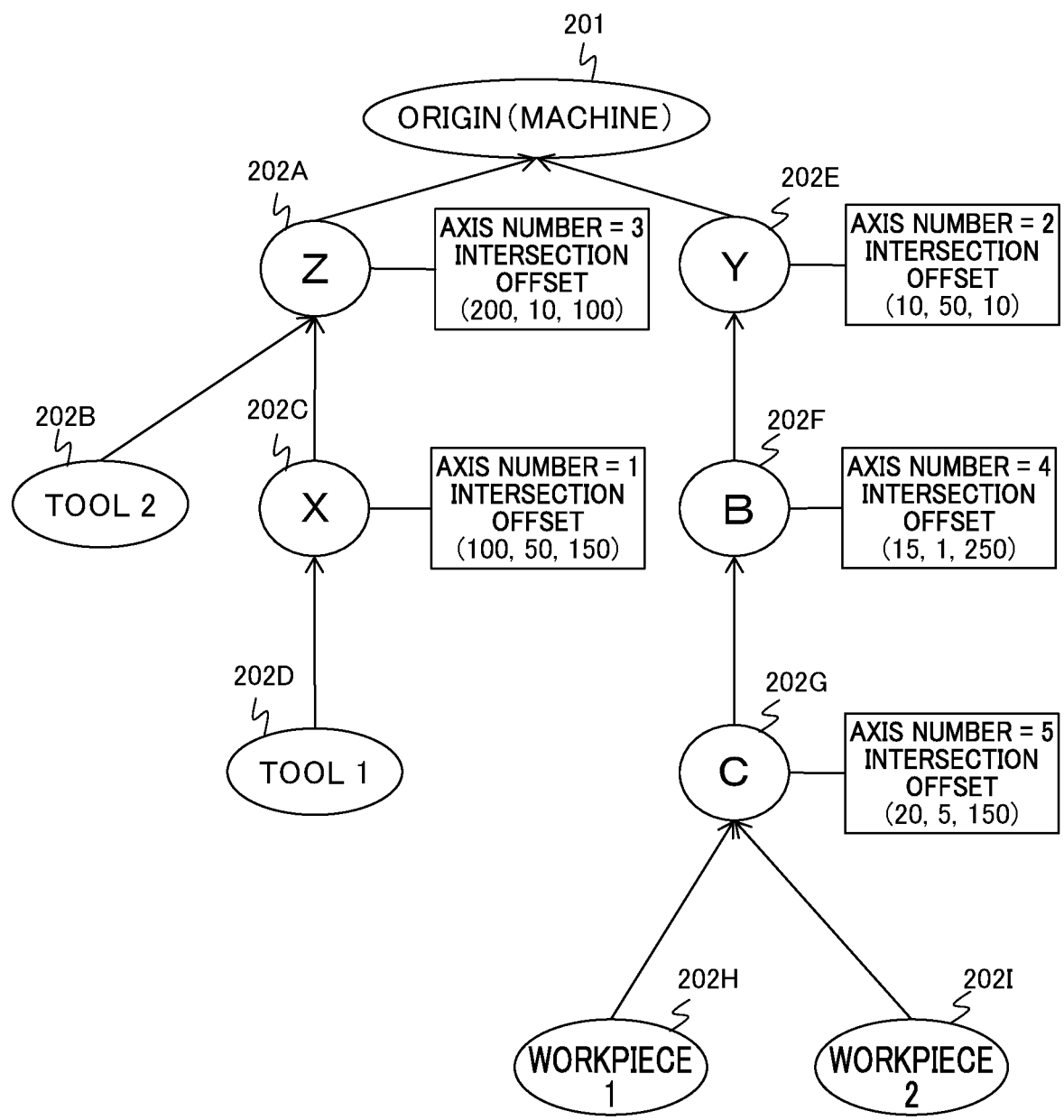
FIG. 9 is an explanatory drawing of a generation method of a machine configuration tree in the second embodiment of the present invention.
Figure 12A:
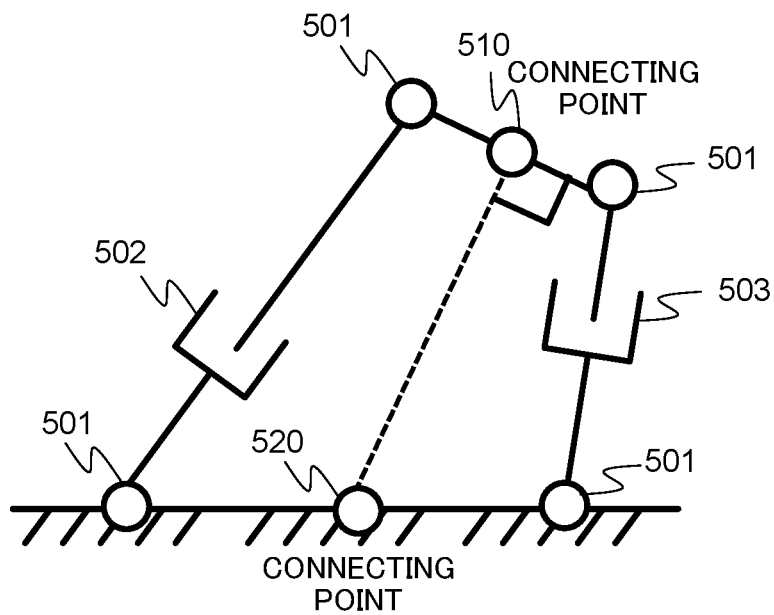
FIG. 12A is an explanatory drawing of a method of inserting a unit to the machine configuration tree.
Figure 12B:
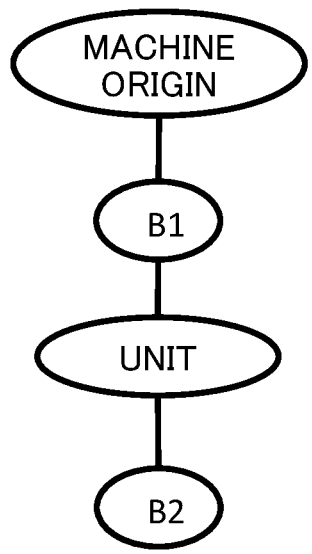
FIG. 12B is an explanatory drawing of a method of inserting a unit to the machine configuration tree.
Figure 12C:
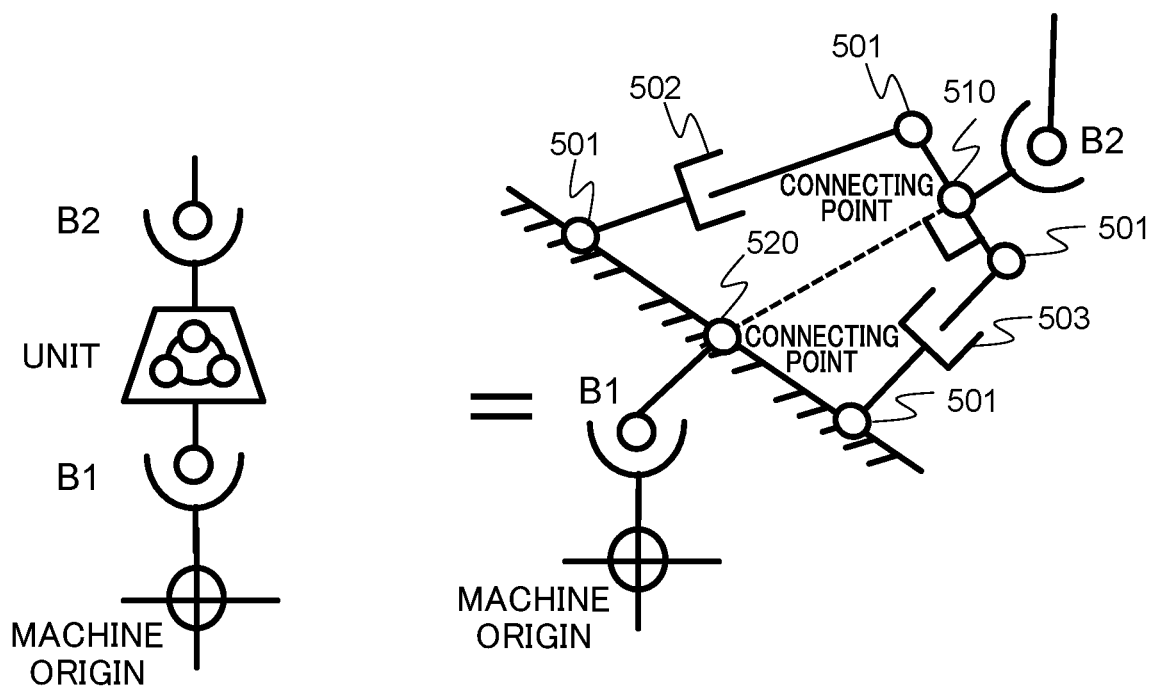
FIG. 12C is an explanatory drawing of a method of inserting a unit to the machine configuration tree.

Next, the axis name (axis type) of each axis, name of each tool, name of each workpiece, name of each origin, and physical axis number (axis type) of each axis are set. Next, the parent node of each axis (axis type), parent node of each tool, and parent node of each workpiece are set. Finally, a cross offset of each axis (axis type), cross offset of each tool, and cross offset of each workpiece are set. As a result thereof, the machine configuration tree shown in FIG. 9 is generated.

It should be noted that each node of the machine configuration tree is not limited to the respective information described above, and for example, may or may not have information related to an identifier (name), identifier of its own parent node, identifier of all child nodes with its own as the parent, relative offset to the parent node (cross offset), relative coordinate value to the parent node, relative movement direction to parent node (unit vector), node type (straight axis/rotation axis/unit (described later)/control point/coordinate system/origin, etc.), physical axis number, and transform of rectangular coordinate system and physical coordinate system.

By setting the value in each node in this way, data having the data structure of machine configuration tree form is generated in the conversion information calculation device 100A. Furthermore, also in the case of adding another machine (or robot), it is possible to add an origin, and add further nodes.

A flowchart generalizing the above-mentioned machine configuration tree generation method, specifically the setting method of each value of each node, is shown in FIG. 10.

In Step S21, the graph generation portion 113 receives the value of parameters set in the node. In Step S22, in the case of the entry of set parameter being "own parent node" (S22: YES), the processing advances to Step S23. In the case of not being "own parent node" (S22: NO), the processing advances to Step S27.

In Step S23, in the case of the parent node already being set in the node in which the parameter is set (S23: YES), the processing advances to Step S24. In the case of the parent node not being set (S23: NO), the processing advances to Step S25.

In Step S24, the graph generation portion 113 deletes its own identifier from the entry of "child node" possessed by the current parent node of the node in which the parameter is set, and updates the machine configuration tree.

In Step S25, the graph generation portion 113 sets the value in this entry of the node setting the parameter.

In Step S26, the graph generation portion 113 adds its own identifier in the entry of "child node" to the parent node, and after updating the machine configuration tree, ends the flow.

In Step S27, the graph generation portion 113 sets the value in this entry of the node setting the parameter, and then ends the flow.

By using the generation method of data having the data structure of the above-mentioned machine configuration tree form, it is possible to set the parent/child relationship between constituent elements of the machine. Herein, the parent/child relationship, when there are two rotation axis nodes 504, 505 as in FIG. 11A, for example, becomes a relationship such that a change in the coordinate value of the one node 504 unilaterally influences the geometric state (typically position/posture) of the other node 505. In this case, the nodes 504, 505 are called a parent/child relationship, and the node 504 is called the parent and node 505 the child. However, as shown in FIG. 11B, for example, in the machine configuration constituted by the two straight axis nodes 502, 503 and four free joints 501, a machine exists influencing each other such that, by the coordinate value (length) of one of the nodes 502 and 503 changing, not only the geometric state of the other, but its own geometric state also changes. In such a case, it can be regarded as being parents to each other, and the child, i.e. parent/child relationship, being two-way.

In this way, for a mechanism such that the change of a certain node interacts with another node, the overall machine configuration tree is generated by capturing as one unit from the viewpoint of convenience, and inserting this unit into the machine configuration tree. The unit has the two of a connection point 510 and connection point 520 as in FIG. 12A, and in the case of the unit being inserted in the machine configuration tree as in FIG. 12B, the parent node is connected to the connection point 520, and the child node is connected to the connection point 510, as in FIG. 12C. In addition, the unit has a conversion matrix from the connection point 520 to the connection point 510. This conversion matrix is represented by the coordinate value of each node included in the unit. For example, in the case of a machine configuration such as FIG. 13, when defining the homogenous matrix representing the position/posture of the connection point 520 as MA, and defining the homogenous matrix representing the position/posture of the connection point 510 as $M_B$, the transformation between these matrices is presented as follows using coordinate values $x_1$, $x_2$ of each straight-axis node included in the unit.

When it is assumed [Math. 1]

$$\theta = \sin^{-1}\left(\frac{x_1^2 - x_2^2}{4L_1L_2}\right)$$

$$L = L_1\cos\theta + \sqrt{0.5x_1^2 + 0.5x_2^2 - L_2^2 - L_1^2\sin^2\theta}$$

-continued the formula is represented $$M_B = TM_A \text{ where } T = \begin{pmatrix} \sin\theta & 0 & \cos\theta & L\cos\theta \\ 0 & 1 & 0 & 0 \\ -\cos\theta & 0 & \sin\theta & L\sin\theta \\ 0 & 0 & 0 & 1 \end{pmatrix}$$

The unit representing this machine configuration possesses a homogenous conversion matrix such as T in the mathematical expression of the above Formula 1. Homogenous matrix is the matter of being a 4×4 matrix which collectively expresses the position/posture as in the mathematical expression of Formula 2 below.

[Math. 2]
$$\begin{pmatrix} \overbrace{\begin{array}{ccc} \cos\theta & -\sin\theta & 0 \\ \sin\theta & \cos\theta & 0 \\ 0 & 0 & 1 \end{array}}^{\text{posture}} & \overbrace{\begin{array}{c} x \\ y \\ z \end{array}}^{\text{position}} \\ 0 \quad 0 \quad 0 & 1 \end{pmatrix}$$

In addition, even in the case of the parent-child relationship not being reciprocal, in order to simplify the computational process and settings, a unit compiling a certain plurality of nodes into one in advance may be defined, and configured into the machine configuration tree.

As mentioned above, in the present embodiment, the graph of the machine configuration can include the unit compiling a plurality of axes into one as a constituent element.

2.5 Automatic Insertion of Control Points and Coordinate Values

In order to designate various positions on the machine configuration as control points, and set a coordinate system of various locations on the machine configuration, the following method is executed using the machine configuration tree generated in the above <2.4 Generation of machine configuration tree>.

Figure 14A:
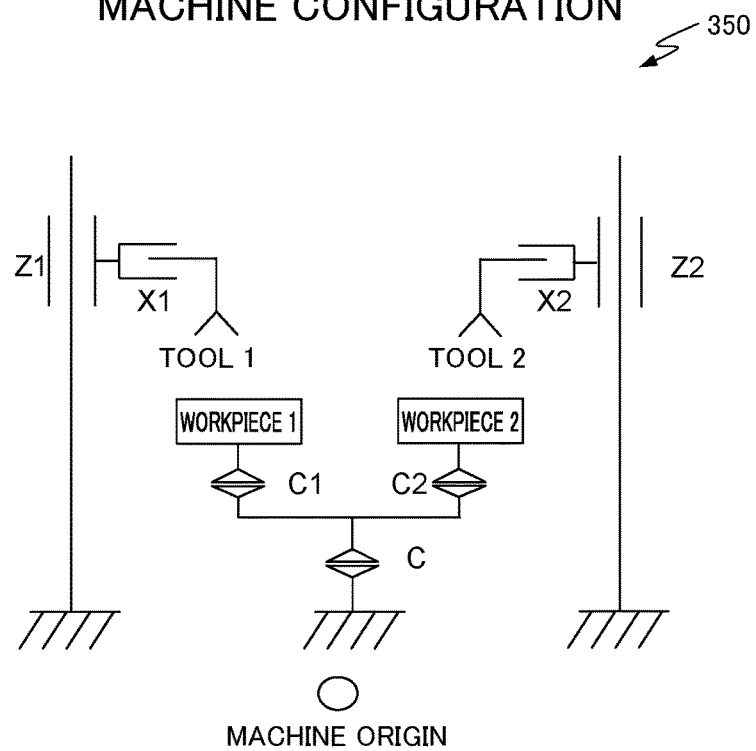
FIG. 14A is a view showing an example of a machine serving as a generation target of the machine configuration tree.
Figure 14B:
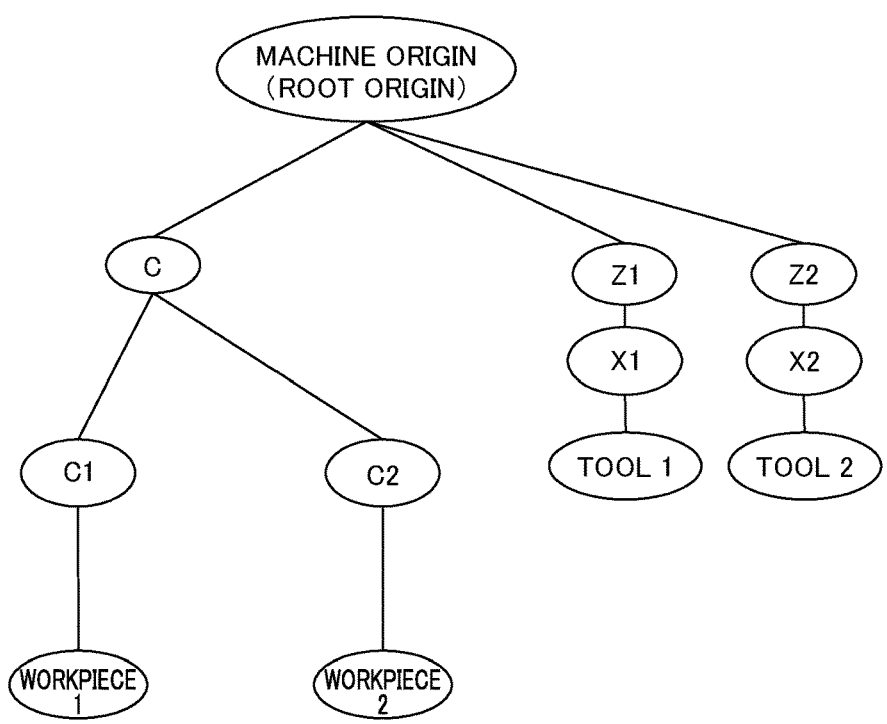
FIG. 14B is a view showing an example of a machine configuration tree corresponding to the machine serving as the generation target of the machine configuration tree.

For example, in the rotary index machine 350 shown in FIG. 14A, the X1 axis is set as perpendicular to the Z1 axis, and the tool 1 is installed to the X1 axis. In addition, the X2 axis is set as perpendicular to the Z2 axis, and the tool 2 is installed on the X2 axis. Furthermore, in the table, C1 axis and C2 axis shall be set in parallel on the C axis, and the workpiece 1 and workpiece 2 shall be installed on the C1 axis and C2 axis, respectively. When expressing this machine configuration by the machine configuration tree, it becomes the machine configuration tree shown in FIG. 14B.

Figure 15:
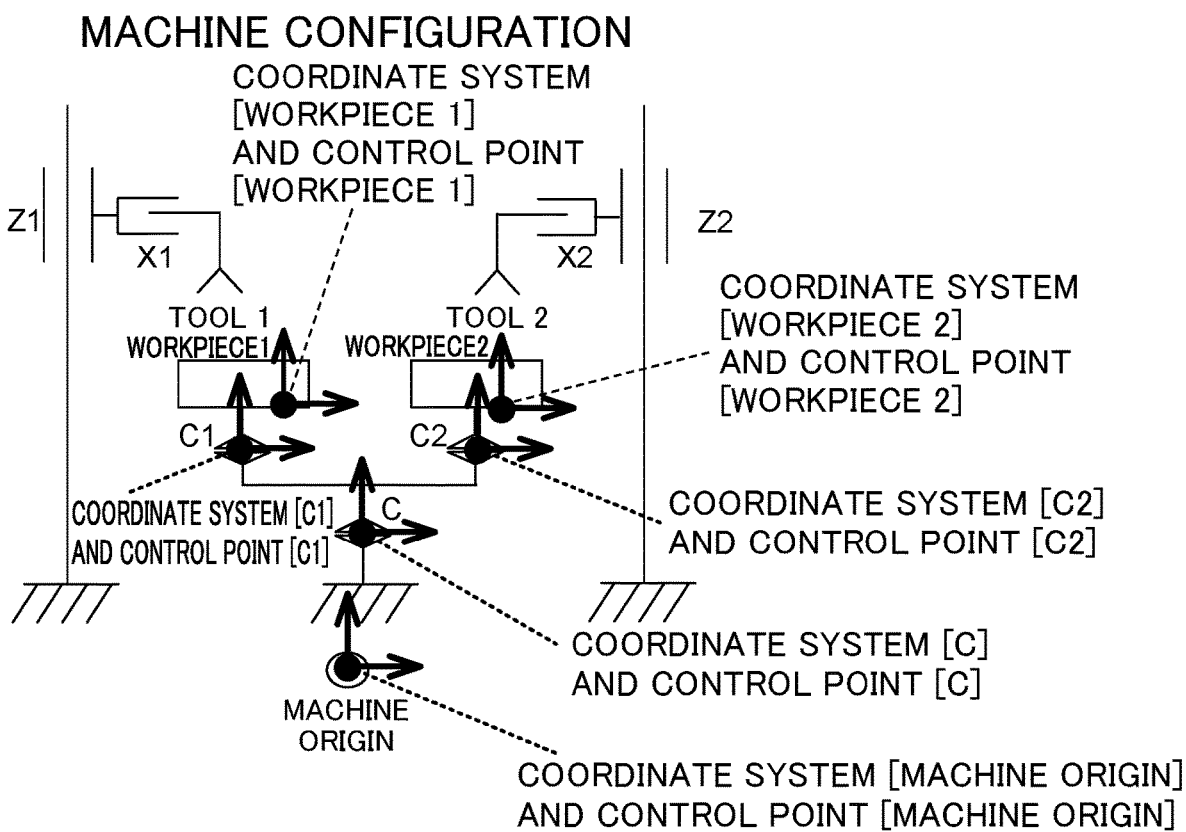
FIG. 15 is a view showing an example of a coordinate system and control point inserted into each node of the machine in the second embodiment of the present invention.
Figure 16:
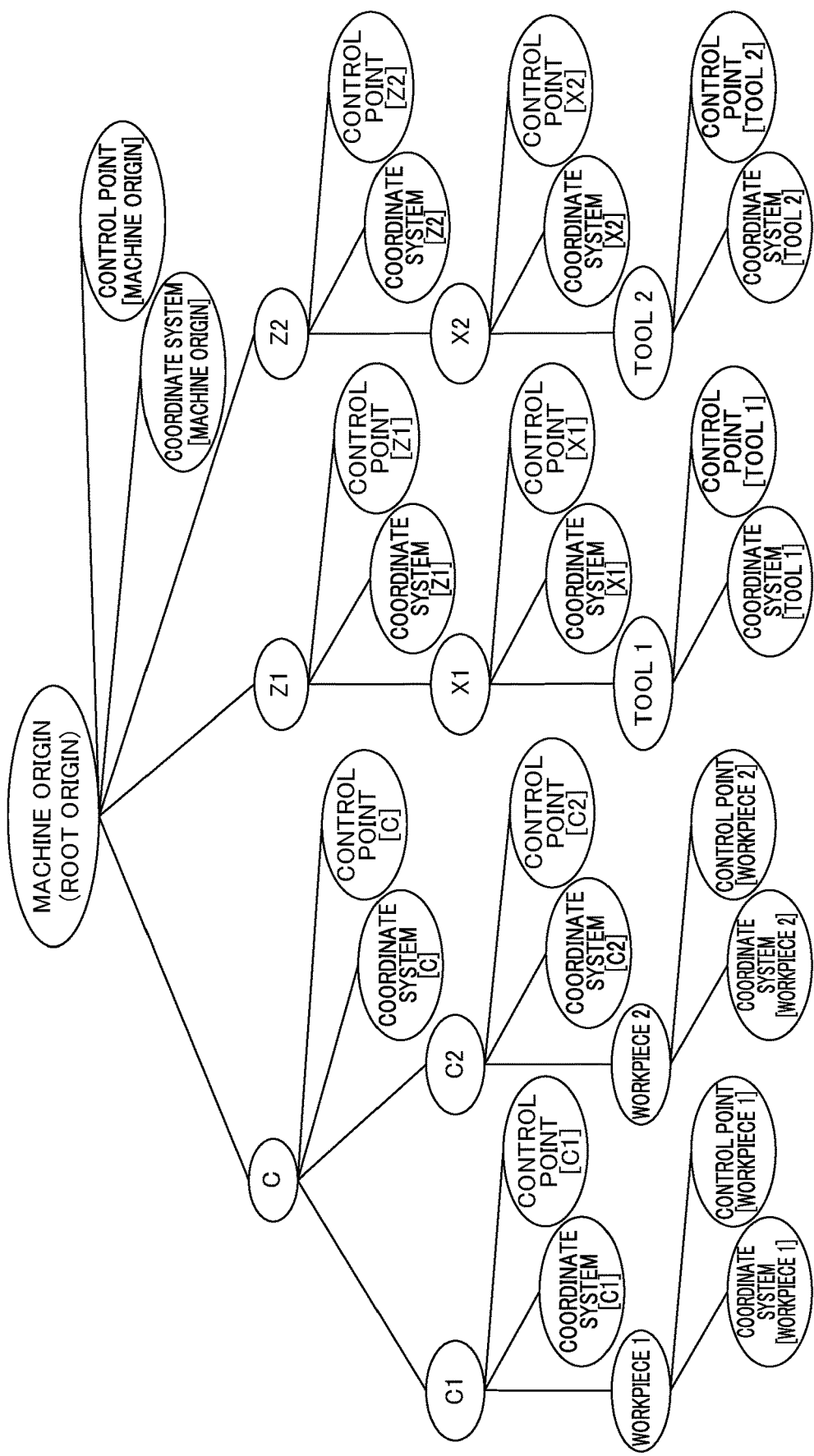
FIG. 16 is a view showing an example of a machine configuration tree in which a coordinate system and control point were inserted in the second embodiment of the present invention.

When assuming a series of nodes from each workpiece leading to the machine origin as an example, the coordinate system and control point are automatically inserted into each of the machine origin, C axis, C1 axis, C2 axis, workpiece 1 and workpiece 2, as shown in FIG. 15. This is implemented not only on the table, but on the series of nodes from each tool leading to the machine origin, i.e. all of the X1 axis, X2 axis, Z1 axis, Z2 axis, tool 1 and tool 2. As a result thereof, as shown in FIG. 16, the control point and coordinate system corresponding to each are automatically inserted relative to all nodes constituting the machine configuration tree. Normally, in the case of performing machining, the coordinate system and tool are designated in the workpiece as the control points. For example, it thereby becomes possible to respond to various cases such as a case of wanting to designate the control point in a workpiece in order to cause the workpiece itself to move to a predetermined position, or a case of wanting to set the coordinate system in the tool itself in order to polish another tool with a certain tool.

Figure 17A:
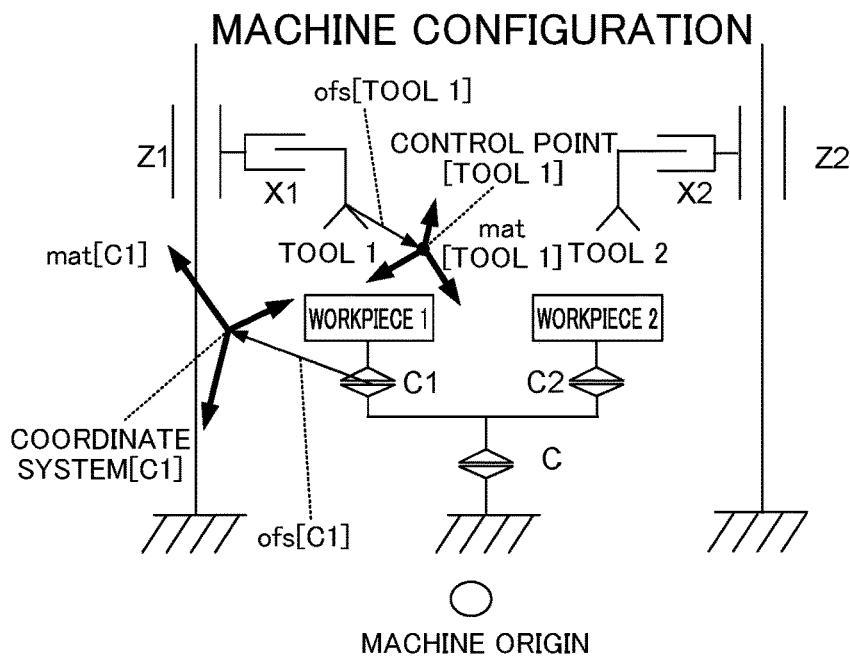
FIG. 17A is a view showing an example in which an offset and posture matrix are inserted into each node in the second embodiment of the present invention.
Figure 17B:
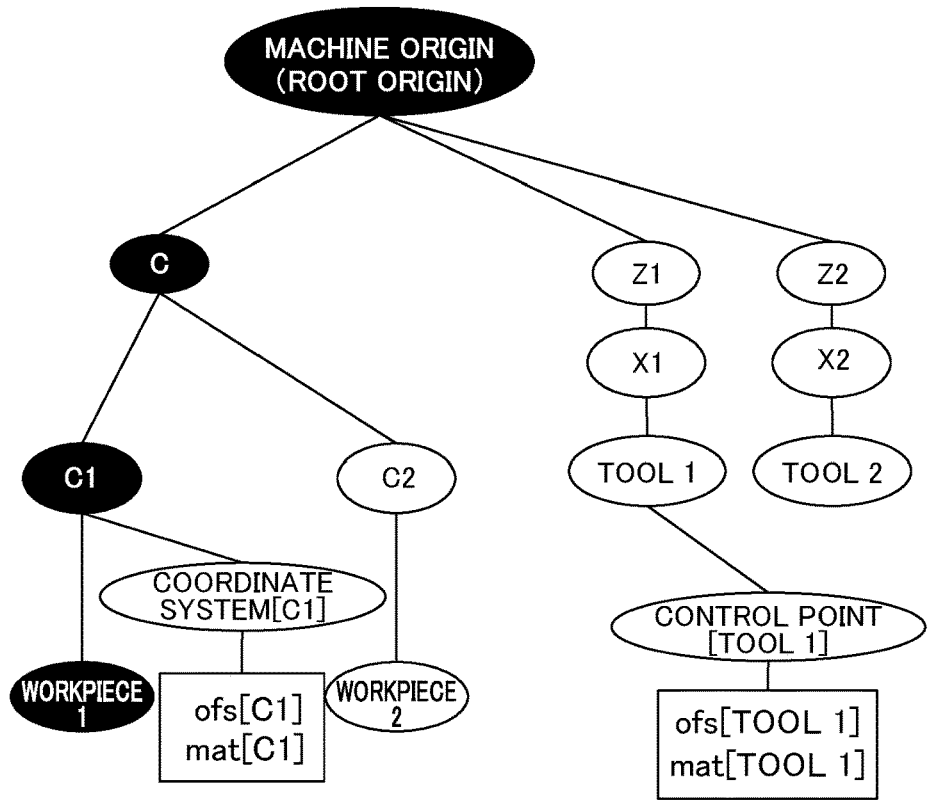
FIG. 17B is a view showing an example in which an offset and posture matrix were inserted into each node of a machine in the second embodiment of the present invention.

In addition, as shown in FIG. 17A, each control point and coordinate system has offset. For this reason, it is also possible to establish a point distanced from the node center as a control point or coordinate system origin. Furthermore, each control point and coordinate system has a posture matrix. This posture matrix, in the case of being a posture matrix of a control point, represents the posture (orientation, slope) of a control point, and in the case of being a posture matrix of coordinate system, represents the posture of the coordinate system. In the machine configuration tree shown in FIG. 17B, the offset and posture matrix are expressed in a form in which each is associated with a corresponding node. Furthermore, each control point and coordinate system has information of whether or not taking account of "movement" and "intersection offset" of a node existing on the pathway until a root of the machine configuration tree, respectively, and can set these.

Figure 18:
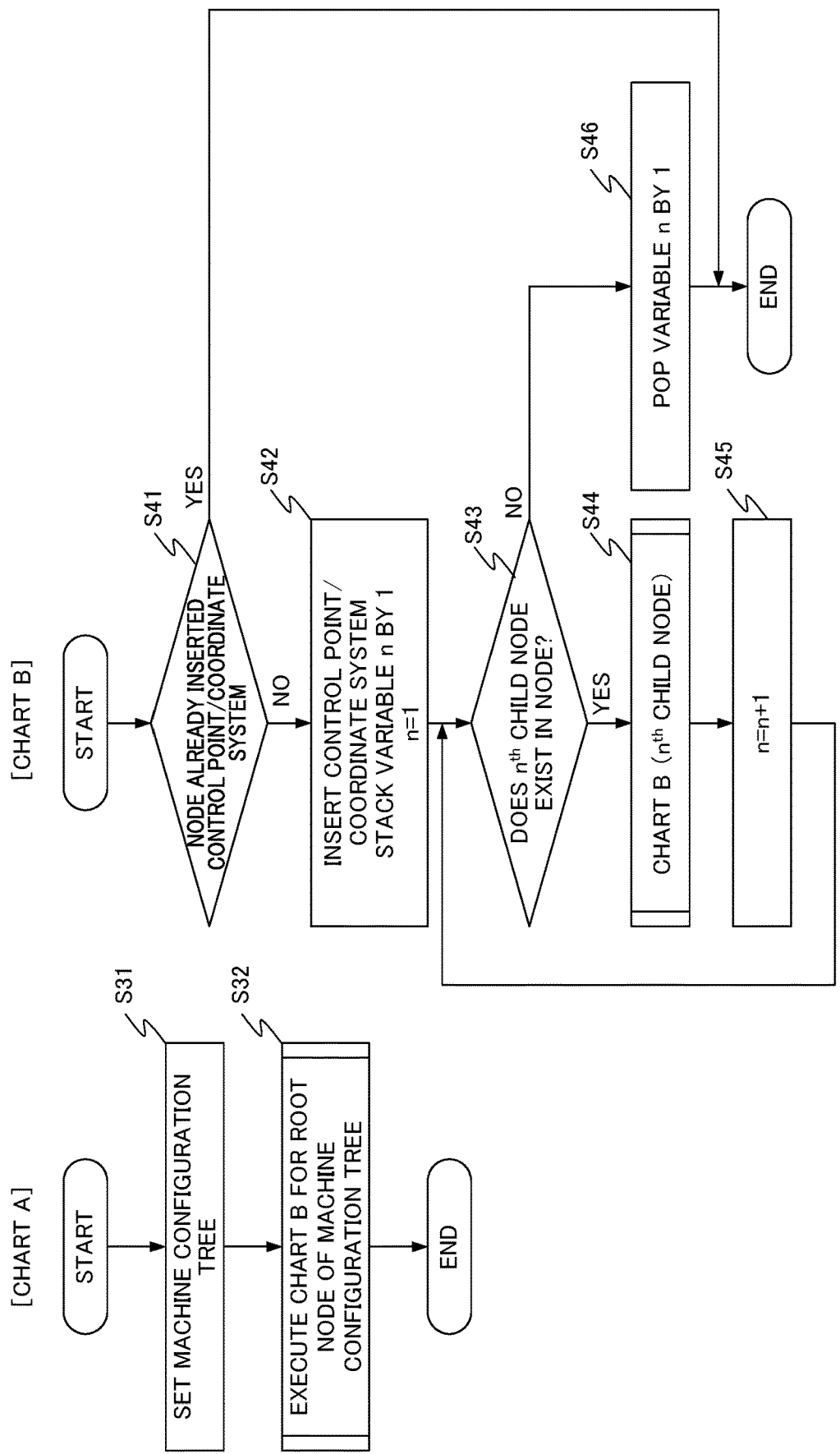
FIG. 18 is a flowchart showing operation of inserting control points into the machine configuration tree in the second embodiment of the present invention.

A flowchart obtained by generalizing the automatic insertion method of the control point described above is shown in FIG. 18. In detail, this flowchart includes a chart A and a chart B, and as described later, becomes a configuration such that chart B is executed in the middle of chart A.

First, chart A will be explained. In Step S31, the graph generation portion 113 sets a machine configuration tree. In Step S32, chart B is executed, and the flow of chart A is ended.

Next, chart B will be explained. In Step S41 of chart B, in the case of the node having inserted the control point and coordinate system (S41: YES), the flow is ended. In the case of the control point and coordinate system not having been inserted in the node (S41: NO), the processing advances to Step S32.

In Step S42, the control point coordinate system insertion portion 114 inserts a control point/coordinate system in the node, and stacks one of variable n. In addition, n=1 is established.

In Step S43, in the case of the $n^{th}$ child node being present in the node (S43: YES), the processing advances to Step S44. In the case of the $n^{th}$ child node not existing in the node (S43: NO), the processing advances to Step S46.

In Step S44, chart B itself is recursively executed for the $n^{th}$ child node.

In Step S45, n is incremented by 1. In other words, n=n+1 is established, and the processing returns to Step S43.

In Step S46, the variable n is popped by 1, and the flow of chart B is ended.

Figure 19:
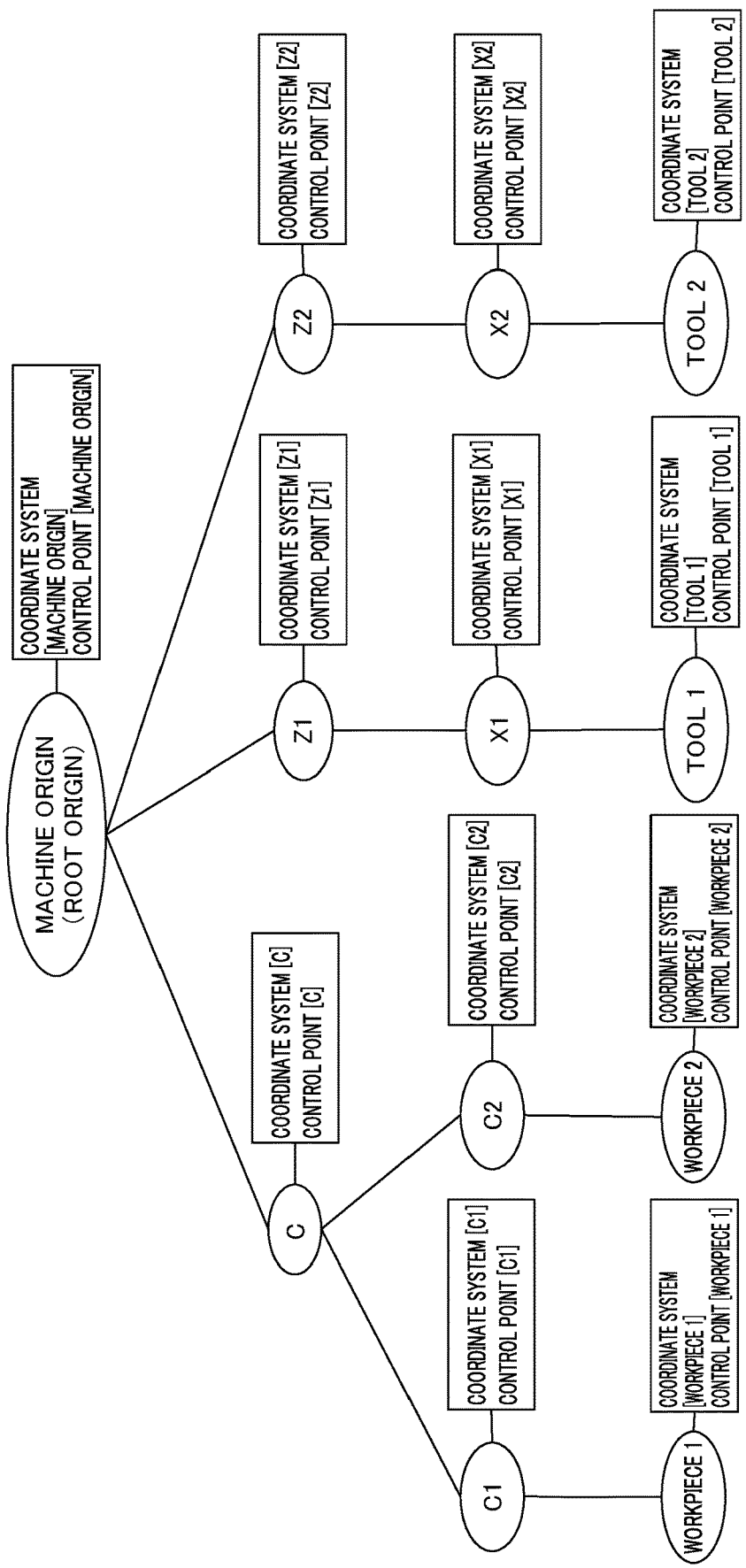
FIG. 19 is a view showing an example of a machine configuration tree in which coordinate systems and control points were inserted in the second embodiment of the present invention.

By the above-mentioned method, the control point coordinate system insertion portion 114 inserts, as a node, the control point and coordinate system in each node of the graph of the machine configuration. It should be noted that, although the above description shows an example of a case of adding the control point and coordinate system as nodes, an embodiment is also possible in which the control point coordinate system insertion portion 114 gives the control point and coordinate system as information to each node of the graph in the machine configuration, as shown in FIG. 19.

2.6 Calculation of Conversion Information

As described above, the conversion information calculation portion 111A calculates the conversion information including the coordinate value of a control axis node on the pathway from the camera node to the node of the display target as a variable, which is conversion information for calculating the position and/or posture of a node of each display target, on the coordinate system of the camera node, based on the above-mentioned graph. The calculation method of this conversion information will be described in detail by referencing FIGS. 20 and 21.

Figure 20:
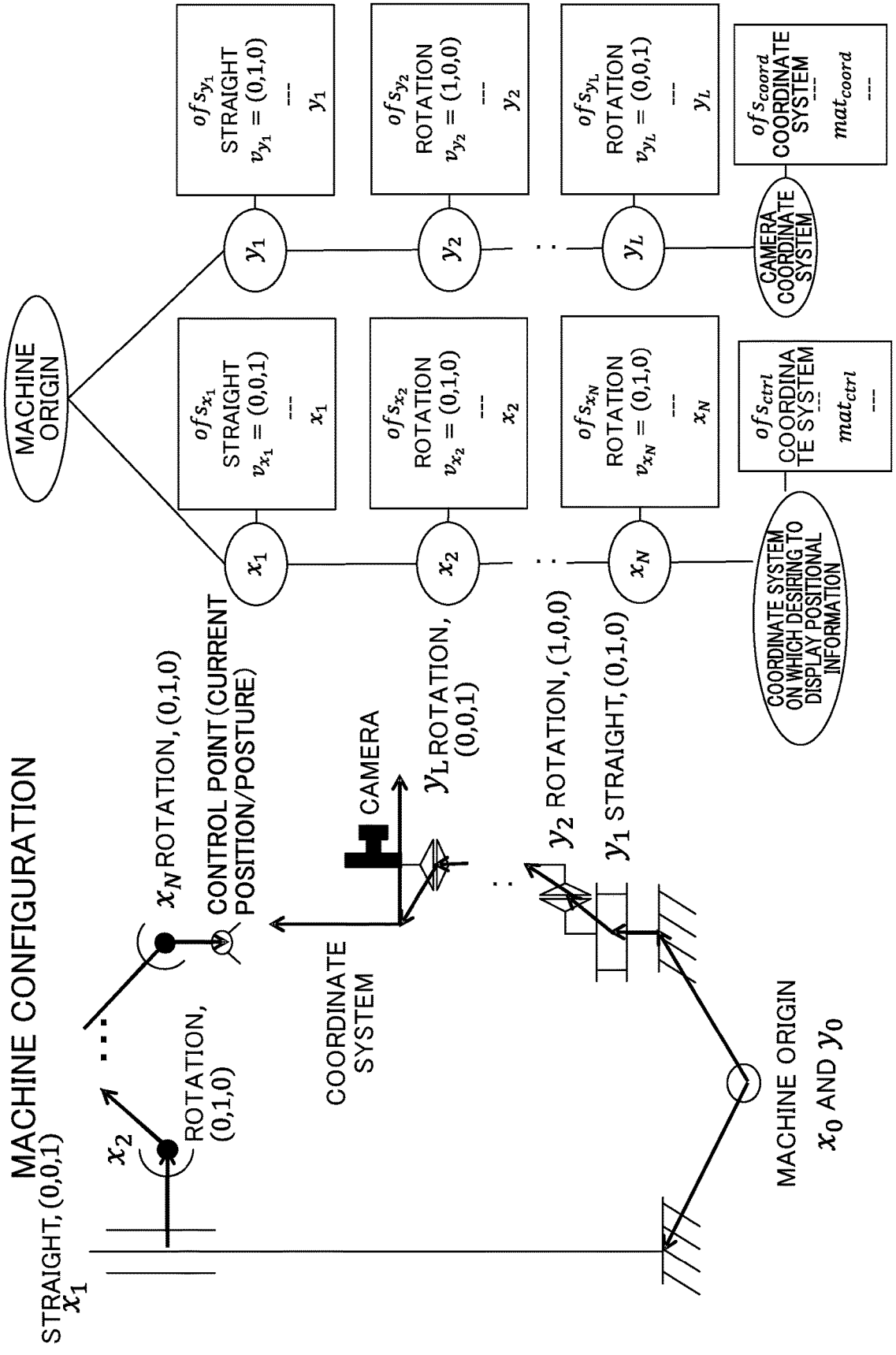
FIG. 20 is a view showing an example of information used upon generating conversion information in the second embodiment of the present invention.

For example, as shown in FIG. 20, the axis $x_2$ is set on the axis $x_1$, the axis $x_3$ is set on the axis $x_2$, N number of nodes is connected similarly hereafter, and the terminus thereof shall be axis $x_N$. Furthermore, it shall display positional information including the coordinate system and grid at the control point on the axis $x_N$. Similarly, axis $y_2$ is set on the axis $y_1$, the axis $y_3$ is set on the axis $y_2$, L number of nodes is connected similarly thereafter, and the terminus thereof shall be axis $y_L$. Furthermore, the camera shall be installed on the axis $y_L$. Herein, xi, yi are node names; however, the coordinate value of each node shall also be represented at the same time.

Furthermore, an offset, node type (straight line/rotation/unit/control point/coordinate system), axis direction, posture matrix and coordinate value shown in FIG. 20 shall be given to each node.

Figure 21:
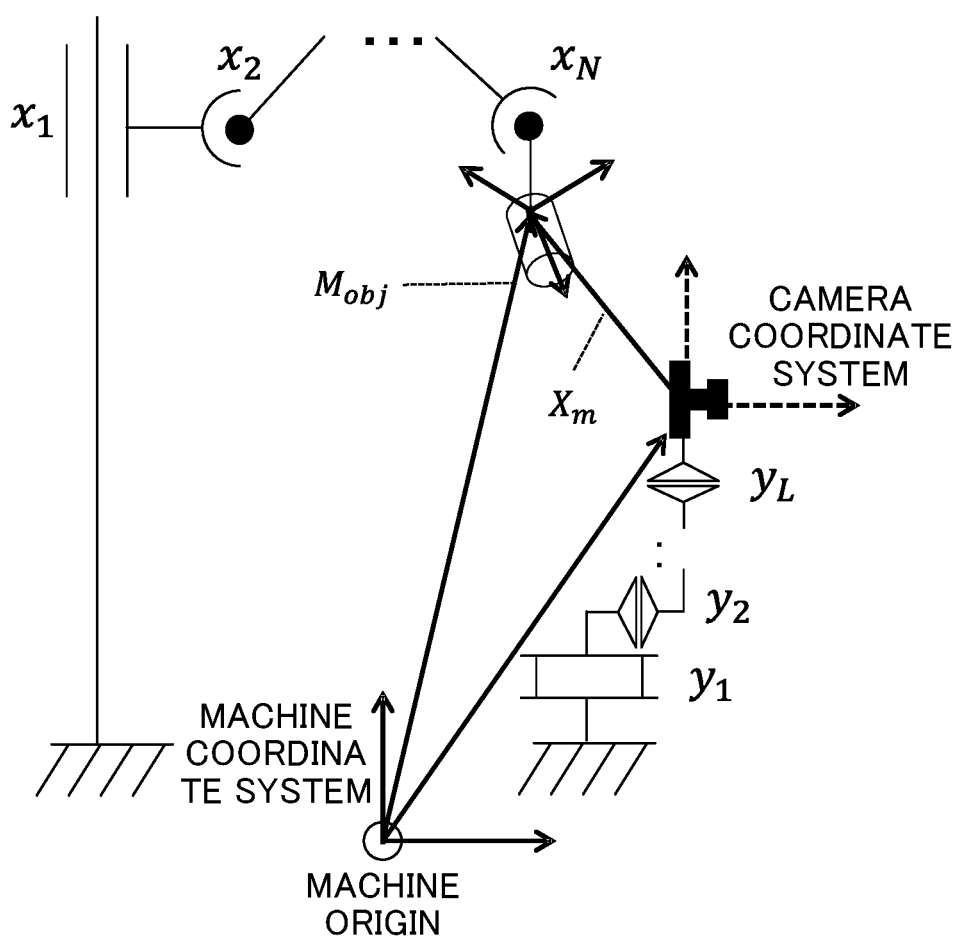
FIG. 21 is a view showing an example of information used upon generating conversion information in the second embodiment of the present invention.

At this time, as shown in FIG. 21, a homogeneous matrix $M_{obj}$ representing the current position/posture of positional information including the coordinate system and grid desired to display positional information on a root (machine origin) is obtained by the following formula.

[Math. 3]
$$M_{obj} = \left(\prod\nolimits_{i=1}^{N} S_{x_i}\right) M_{ctrl} \text{ Provided that } \prod\nolimits_{i=1}^{N} S_{x_i} = S_{x_1} S_{x_2} \cdots S_{x_N}$$

However, the meanings of symbols are as follows. $S_{xi}$: homogeneous conversion matrix according to each node;

N: number of series of nodes connecting from the root of the machine configuration tree until node corresponding to coordinate system on which it is desired to display positional information;

$M_{ctrl}$: homogeneous matrix of relative offset and posture with respect to parent node of node corresponding to coordinate system on which it is desired to display positional information, which is defined according to Formula 2 described above, from the offset vector/posture matrix defined in the node corresponding to the coordinate matrix on which it is desired to display the positional information.

A synchronous conversion matrix $S_{xi}$ changes depending on the type of node, and for example, is expressed as follows in the case of a linear axis.

[Math. 4]
$$S_{x_i} = \begin{pmatrix} 1 & 0 & 0 & \\ 0 & 1 & 0 & \overrightarrow{ofs_{x_i}} \\ 0 & 0 & 1 & \\ 0 & 0 & 0 & 1 \end{pmatrix} \begin{pmatrix} 1 & 0 & 0 & \\ 0 & 1 & 0 & x_i \overrightarrow{v_{x_i}} \\ 0 & 0 & 1 & \\ 0 & 0 & 0 & 1 \end{pmatrix}$$

However, the meanings of symbols are as follows.

$x_i$: coordinate value of node xi; of $s_{xi}$: relative offset vector in relation to parent node of node xi;

$v_{xi}$: movement direction vector of node xi

In addition, a case of the rotary axis is expressed as follows.

[Math. 5]
$$S_{x_i} = \begin{pmatrix} 1 & 0 & 0 & \\ 0 & 1 & 0 & \overrightarrow{ofs_{x_i}} \\ 0 & 0 & 1 & \\ 0 & 0 & 0 & 1 \end{pmatrix} R(x_i, v_1, v_2, v_3)$$

$$R(x_i, v_1, v_2, v_3) = \begin{pmatrix} v_1^2(1-\cos x_i)+\cos x_i & v_1 v_2(1-\cos x_i)-v_3 \sin x_i & v_1 v_3(1-\cos x_i)+v_2 \sin x_i & 0 \\ v_1 v_2(1-\cos x_i)+v_3 \sin x_i & v_2^2(1-\cos x_i)+\cos x_i & v_3 v_2(1-\cos x_i)-v_1 \sin x_i & 0 \\ v_1 v_3(1-\cos x_i)-v_2 \sin x_i & v_2 v_3(1-\cos x_i)+v_1 \sin x_i & v_3^2(1-\cos x_i)+\cos x_i & 0 \\ 0 & 0 & 0 & 1 \end{pmatrix}$$

However, the meanings of symbols are as follows.

$v_1$: first component of rotary axis direction vector of node xi;

$v_2$: second component of rotary axis direction vector of node xi;

$v_3$: third component of rotary axis direction vector of node xi

At this time, the homogenous matrix $X_c$ representing the current position/posture of the positional information including the coordinate system and grid on which it is desired to display positional information on the camera coordinate system is obtained by the following formula using $M_{obj}$.

[Math. 6]
$$X_C = M_{coord}^{-1} \left(\prod\nolimits_{i=L}^{N} S_{x_i}^{-1}\right) M_{obj}$$

$$\text{Provided that } \prod\nolimits_{i=L}^{1} S_{x_i}^{-1} = S_{x_L}^{-1} S_{x_{L-1}}^{-1} \cdots S_{x_1}^{-1}$$

However, the meanings of symbols are as follows. L: number of series of nodes connecting from the root of the machine configuration tree until camera node;

$M_{coord}$: homogenous matrix of relative offset and posture with respect to the parent node of the camera, and defined according to numerical formula of Formula 2 described above, from the offset vector/posture matrix defined in the camera node.

It should be noted that the display method of positional information including the coordinate system and grid by way of the graph generation portion 113, node information notification portion 115, conversion information calculation portion 111A and conversion information notification portion 112 will be described in detail in <2.7 Display method of positional information> below.

2.7 Display Method of Positional Information

Figure 22A:
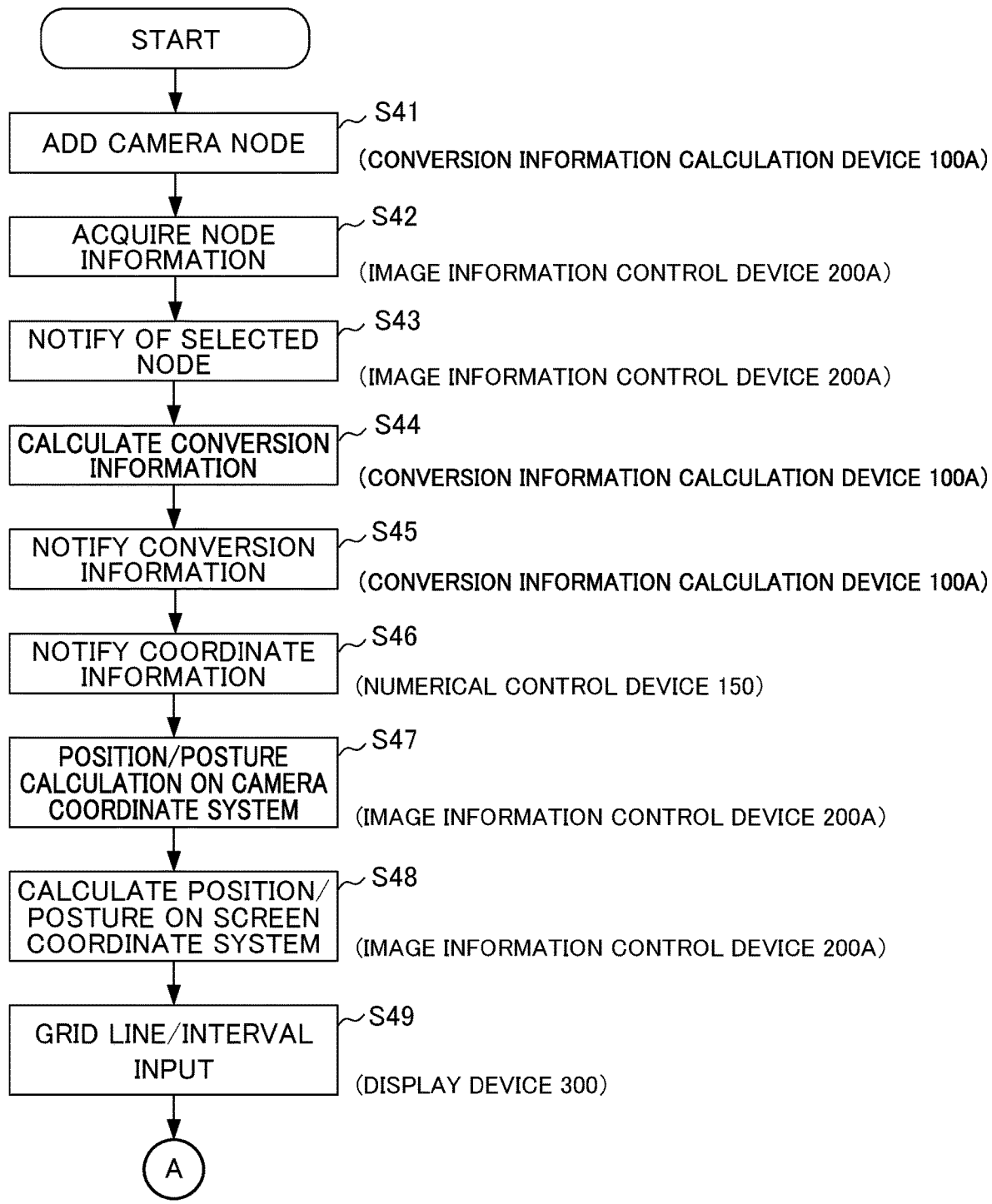
FIG. 22A is a view showing the operation flow of a positional information display method according to the second embodiment of the present invention.
Figure 22B:
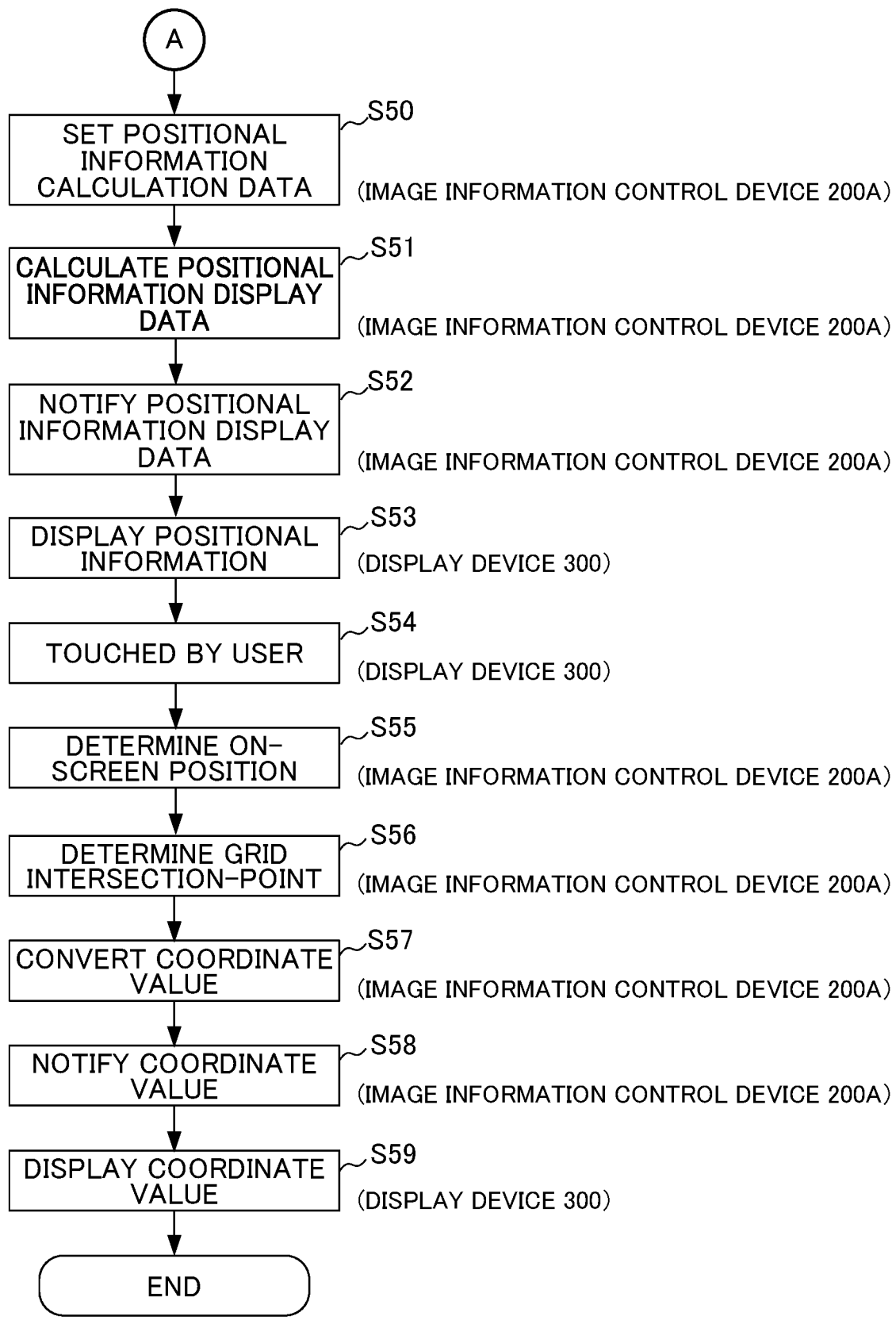
FIG. 22B is a view showing the operation flow of a positional information display method according to the second embodiment of the present invention.

FIGS. 22A and 22B show the operation flow upon displaying positional information which includes the coordinate system and grid. First, an outline of each step will be mentioned.

Figure 23:
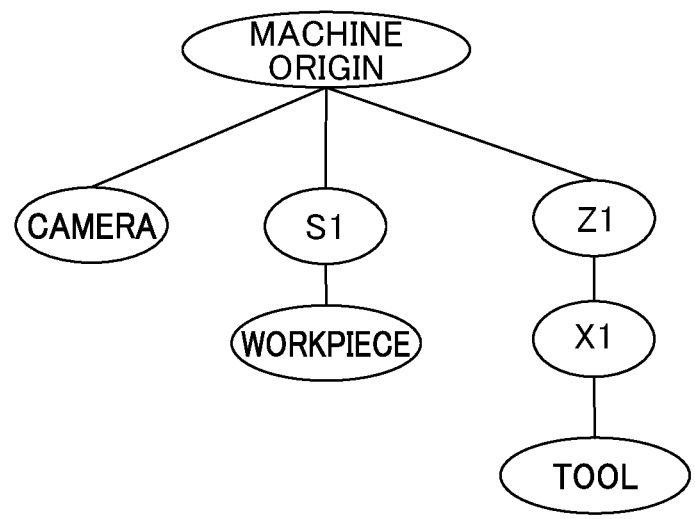
FIG. 23 is a view showing an example of the machine configuration tree including a camera node in the second embodiment of the present invention.

In Step S41, the conversion information calculation device 100A (node addition portion 116) adds the camera node as a new node to the machine configuration tree, as shown in FIG. 23.

In Step S42, the image information control device 200A (control unit 210A) acquires information of nodes which can be selected as a coordinate system, from the conversion information calculation device 100A.

In Step S43, the image information control device 200A (node selection portion 219) selects a node corresponding to the coordinate system displaying the positional information, and the image information control device 200A (selected node notification portion 220) notifies the selected node to the conversion information calculation device 100A.

In Step S44, the conversion information calculation device 100A (conversion information calculation portion 111A) calculates the conversion information which obtains the position and/or posture of positional information in the camera coordinate system, with the coordinate value of each axis of the machine tool 400 as variables.

In Step S45, the conversion information calculation device 100A (conversion information notification portion 112) notifies of conversion information calculated by the conversion information calculation device 100A (conversion information calculation portion 111A) to the image information control device 200 (coordinate information conversion portion 211A).

In Step S46, the numerical control device 150 (coordinate information notification portion 161) notifies of the coordinate information of the machine tool 400 in operation to the image information control device 200A (coordinate information conversion portion 211A) in real time. Although this notification being executed only one time is illustrated in FIG. 22A, it may be executed periodically.

In Step S47, the image information control device 200A (coordinate information conversion portion 211A) calculates the position and/or posture in the camera coordinate system, of positional information including the coordinate system and grid, from the conversion information received from the conversion information calculation device 100A and the coordinate values of each control axis which is periodically notified from the numerical control device 150.

In Step S48, the image information control device 200A (positional information calculation data setting portion 212) obtains the position and/or posture in the screen coordinate system, by conversion of the coordinate system from the position and/or posture in the camera coordinate system.

In Step S49, the operator selects a line of the grid to be displayed from the touch panel of the display device 300, and inputs the interval of grid lines.

In Step S50, the image information control device 200A (positional information calculation data setting portion 212) sets the calculation data for visually displaying the position and/or posture of positional information including the coordinate system and grid on the screen coordinate system, on the touch panel serving as a screen surface of the display device 300.

In Step S51, the image information control device 200A (positional information display data calculation portion 213) calculates the display data for displaying positional information which includes the coordinate system and grid to draw on the touch panel serving as the screen of the display device 300.

In Step S52, the image information control device 200A (positional information display data notification portion 214) notifies of display data for displaying the positional information including the coordinate system and grid on the display device 300.

In Step S53, the display device 300 displays the positional information including the coordinate system and grid, based on the display data acquired from the image information control device 200.

In Step S54, the operator touches an arbitrary point on the touch panel provided to the display device 300.

In Step S55, the image information control device 200 (on-screen position determination portion 215) determines a position touched by the operator, on the touch panel of the display device 300.

In Step S56, the image information control device 200 (grid intersection-point determination portion 216) determines, among the intersection points of the grid included in the positional information displayed on the touch panel serving as the screen surface of the display device 300, the intersection point closest to the position touched by the operator on the touch panel of the display device 300.

In Step S57, the image information control device 200 (coordinate value conversion portion 217) calculates the coordinate value in the workpiece coordinate system, of the intersection point determined by the grid intersection-point determination portion 216.

In Step S58, the image information control device 200 (coordinate value notification portion 218) notifies of the coordinate value calculated by the image information control device 200 (coordinate value conversion portion 217) to the numerical control device 150 and display device 300.

In Step S59, the display device 300 displays that the intersection point closest to the position touched by the operator on the grid displayed on the touch panel serving as the screen surface of the display device 300 has the above-mentioned coordinate value.

It should be noted that the sequence of the above Steps S41 to S59 can be appropriately switched as needed.

In addition, the position/posture on the camera coordinate system of a node displaying positional information may be obtained by the conversion information calculation device 100A, and the values indicating the position/posture itself may be notified to the image information control device 200A.

In the above Step S47, the image information control device 200A obtains the position/posture in the screen coordinate system from the position/posture in the camera coordinate system. More specifically, the image information control device 200A performs processing to obtain conversion information from the camera coordinate system to the screen coordinate system, and converts the position/posture of positional information including the coordinate system and grid from the camera coordinate system to the value of the screen coordinate system, by way of this conversion information. The positional information display data, in addition to the position/posture of the camera coordinate system and screen coordinate system obtained herein, includes data such as the form of positional information containing the coordinate system and grid. The positional information display data is outputted to the display device 300, and using the outputted data, the display device 300 becomes able to draw the positional information including the coordinate system and grid at the appropriate position.

2.8 Effects Exerted by Second Embodiment

In the positional information display system 10A according to the second embodiment, the conversion information calculation device 100A generates a machine configuration tree constituted by nodes according to the machine configuration of an industrial machine, and adds the node of the camera to this machine configuration tree.

By including the camera as a node on the machine configuration tree, the position/posture on the camera coordinate system is known for all of the nodes on the machine configuration tree. For example, in the case of displaying the workpiece coordinate system and grid thereof, it is possible to draw without problems, even in the case of the workpiece moving relative to the camera, due to performing drawing on the screen coordinate system, based on the position and/or posture of the workpiece node in the camera coordinate system, and the inputted display information.

In addition, by using the machine configuration tree, it is possible for the operator to select an arbitrary coordinate system. Other than the machine coordinate system and workpiece coordinate system, the coordinate system of the tool may be selected as this arbitrary coordinate system, for example. In the coordinate system of the tool, since the tool position is displayed as the origin, the grid interval is the movement amount as is, and the movement amount from the current tool position tends to be selected.

3 Third Embodiment

3.1 Configuration of Positional Information Display System

Figure 24:
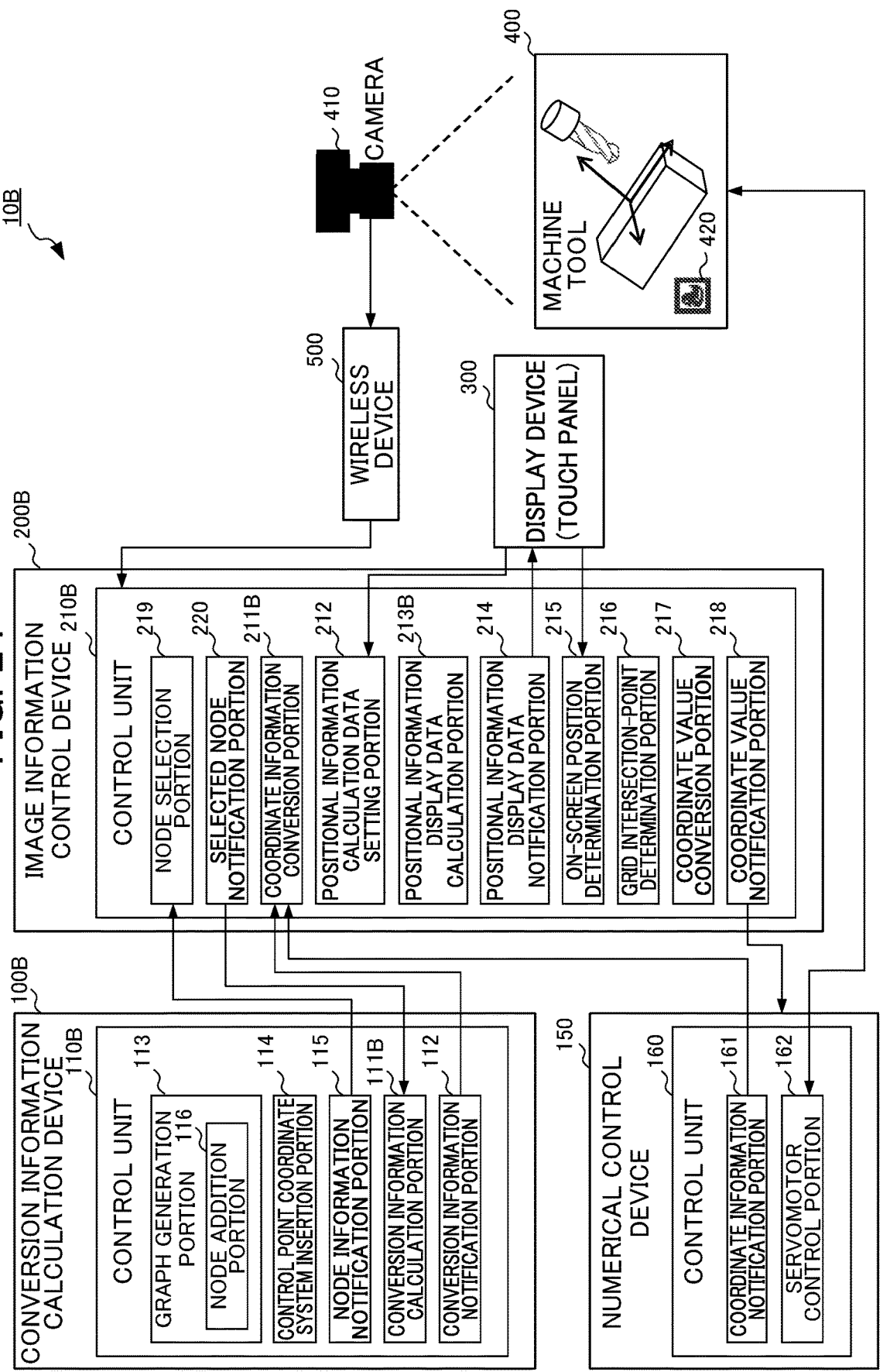
FIG. 24 is a view showing an overall configuration of a positional information display system according to a third embodiment of the present invention.

Next, a third embodiment of the present invention will be explained in detail by referencing the drawings. FIG. 24 shows the overall configuration of a positional information display system 10B according to the third embodiment of the present invention. It should be noted that, hereinafter, among the constituent elements equipped to the positional information display system 10B, the constituent elements identical to the positional information display system 10A according to the second embodiment are illustrated using the same reference symbols, explanation thereof is omitted, and mainly constituent elements differing from the positional information display system 10 will be explained.

In the positional information display system 10B, the machine tool 400 and camera 410 are separate bodies, and the camera 410 is not fixed to the machine tool 400. In addition, a marker 420 is added to the machine tool 400. Furthermore, in the positional information display system 10A, the camera 410 outputs an image acquired by photography to the image information control device 200B via a wireless device 500. It thereby becomes possible to output the image acquired by photography to the image information control device 200B even in a case of the camera 410 not being fixed to the machine tool 400, and being a long distance from the image information control device 200B.

It should be noted that the positional information display system 10B according to the third embodiment of the present invention realizes the same functions as the positional information display system 10A according to the second embodiment, even without the camera 410 being fixed to the machine tool 400, by using the marker 420 added to the machine tool 400, in addition to the above-mentioned machine configuration tree. In order to realize this function, the positional information display system 10B includes different constituent elements than the constituent elements equipped to the positional information display system 10A.

3.2 Configuration of Conversion Information Calculation Device

The conversion information calculation device 100B includes a control unit 110B, and the control unit 110B includes a conversion information calculation portion 111B in place of the conversion information calculation portion 111A equipped to the control unit 110A according to the second embodiment.

After notifying a node corresponding to the coordinate system displayed by the display device 300 from the selected node notification portion 220 of the image information control device 200B, the conversion information calculation portion 111B calculates conversion information which includes the coordinate value of the control axis node on the pathway from the marker node to the node of the display target as a variable, which is conversion information for calculating the position and/or posture of the node of each display target on the coordinate system of the marker node, on the basis of the above-mentioned graph. It should be noted that the above-mentioned conversion information may be matrix format, may be vector format, or may be roll/pitch/yaw format. The detailed operation thereof will be described in detail in <3.4 Calculation of conversion information> below.

It should be noted that the detailed operations of the graph generation portion 113, control point coordinate system insertion portion 114, node information notification portion 115, conversion information calculation portion 111B and conversion information notification portion 112 will be described in detail in <3.5 Display method of positional information> below.

3.3 Configuration of Image Information Control Device

The image information control device 200B includes the control unit 210B, and the control unit 210B includes a coordinate information conversion portion 211B in place of the coordinate information conversion portion 211A equipped to the control unit 210A, and a positional information display data calculation portion 213B in place of the positional information display data calculation portion 213.

The coordinate information conversion portion 211B converts the position and/or posture in the coordinate system displayed on the display device 300 into the position and/or posture in the marker coordinate system. Upon converting the position and/or posture in the marker coordinate system into the position and/or posture in the camera coordinate system, the positional information display data calculation portion 213B calculates the display data for displaying the coordinate system and grid as positional information that draws on the touch panel serving as the screen surface of the display device 300.

3.4 Calculation of Conversion Information

As described above, the conversion information calculation portion 111B calculates conversion information including the coordinate value of a control axis node on the pathway from the marker node to the node of the display target as a variable, which is conversion information for calculating the position and/or posture of the node of each display target on the coordinate system of the marker node, based on the above-mentioned graph. The calculation method of this conversion information is described in detail by referencing FIGS. 25 and 26.

Figure 25:
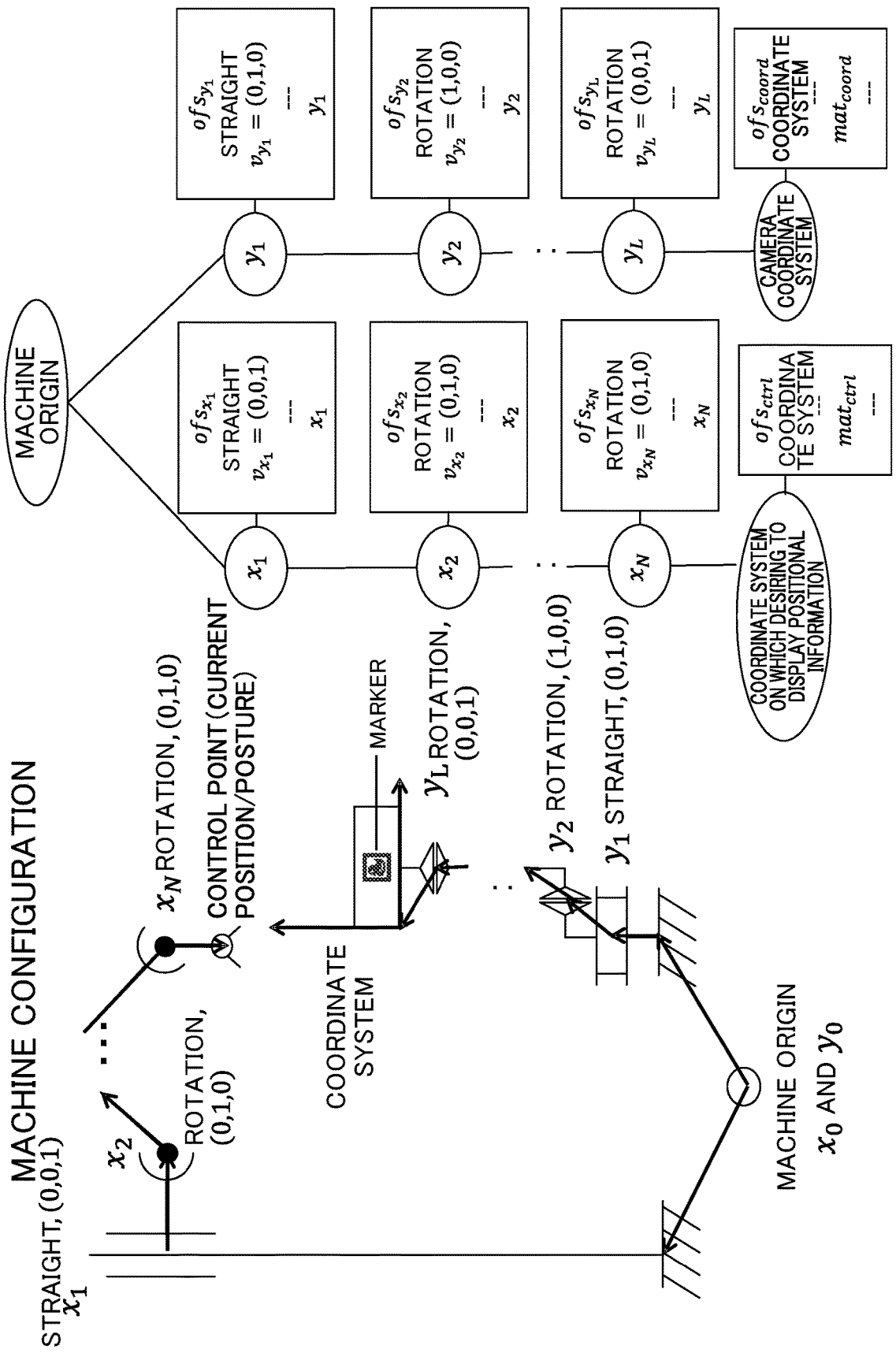
FIG. 25 is a view showing an example of information used upon generating conversion information in the third embodiment of the present invention.

For example, as shown in FIG. 25, axis $x_2$ is set on the axis $x_1$, axis $x_3$ is set on the axis $x_2$, N number of nodes is connected similarly thereafter, and the terminus thereof shall be axis $x_N$. Furthermore, it shall display the positional information including the coordinate system and grid at the control point on the axis $x_N$. Similarly, axis $y_2$ is set on the axis $y_1$, axis $y_3$ is set on the axis $y_2$, L number of nodes is connected similarly thereafter, and the terminus thereof shall be axis $y_L$. Furthermore, the marker shall be installed on the axis $y_L$. Herein $x_i, y_j$ is a node name; however, the coordinate value of each node shall be expressed at the same time.

Furthermore, the offset, node type (straight line/rotary/unit/control point/coordinate system), axial direction, posture matrix and coordinate value shown in FIG. 25 shall also be given to each node.

Figure 26:
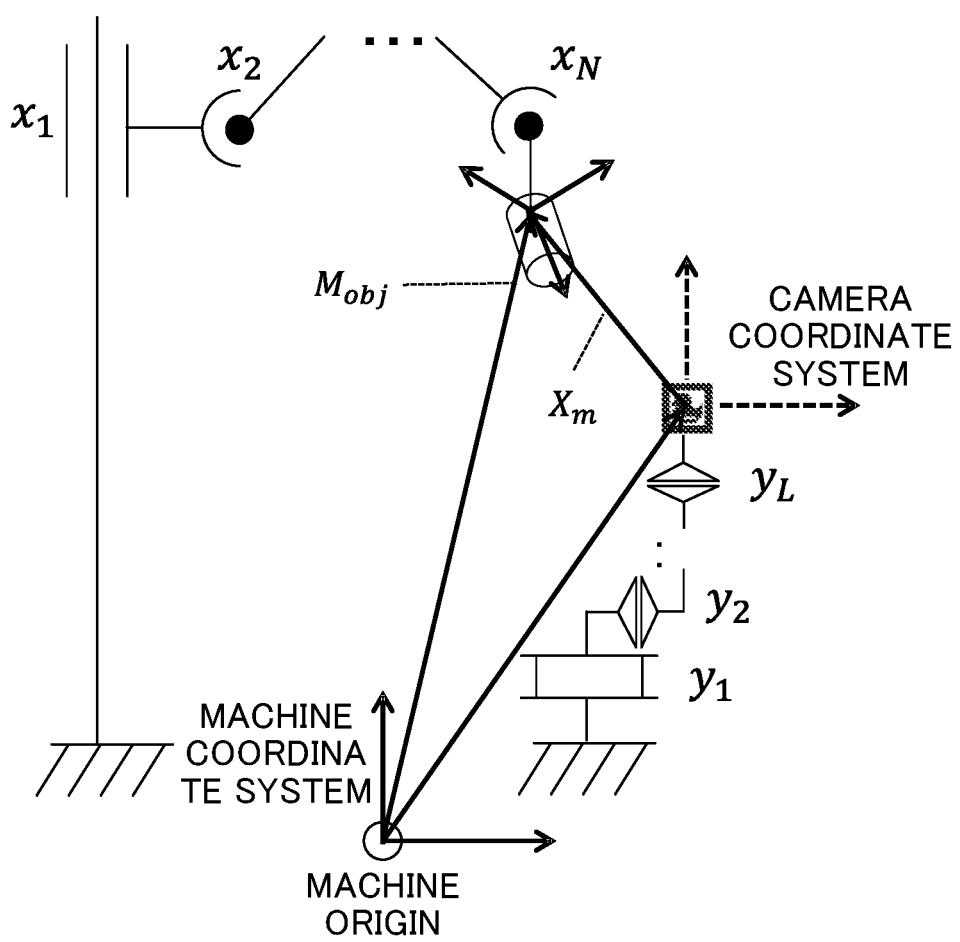
FIG. 26 is a view showing an example of information used upon generating conversion information in the third embodiment of the present invention.

At this time, as shown in FIG. 26, the homogeneous matrix $M_{obj}$ representing the current position/posture of positional information including the coordinate system and grid on which it is desired to display the positional information relative to the root (machine origin) is obtained by the following formula.

[Math. 7]
$$M_{obj} = \left(\prod_{i=1}^{N} S_{x_i}\right) M_{ctrl} \text{ Provided that } \prod_{i=1}^{N} S_{x_i} = S_{x_1} S_{x_2} \cdots S_{x_N}$$

However, the meanings of symbols are as follows. $S_{xi}$: homogeneous conversion matrix according to each node; N: number of series of nodes connecting from the root of the machine configuration tree until node corresponding to coordinate system on which it is desired to display positional information;
$M_{ctrl}$: homogeneous matrix of relative offset and posture with respect to parent node of node corresponding to coordinate system on which it is desired to display positional information, which is defined according to Formula 2 described above, from the offset vector/posture matrix defined in the node corresponding to the coordinate matrix on which it is desired to display the positional information.

At this time, the homogenous matrix $X_m$ representing the current position/posture of positional information including the coordinate system and grid on which it is desired to display the positional information on the marker coordinate system is obtained by the following formula using $M_{obj}$, similarly to the homogeneous matrix $X_c$ of the second embodiment.

[Math. 8]
$$X_m = M_{coord}^{-1} \left(\prod_{i=L}^{N} S_{x_i}^{-1}\right) M_{obj}$$
$$\text{Provided that } \prod_{i=L}^{1} S_{x_i}^{-1} = S_{x_L}^{-1} S_{x_{L-1}}^{-1} \cdots S_{x_1}^{-1}$$

However, the meanings of symbols are as follows. L: number of series of nodes connecting from the root of the machine configuration tree until marker node;
$M_{coord}$: homogenous matrix of relative offset/posture with respect to the parent node of the marker, and defined according to numerical formula of Formula 2 described above, from the offset vector/posture matrix defined in the marker node.

3.5 Display Method of Positional Information

Figure 27A:
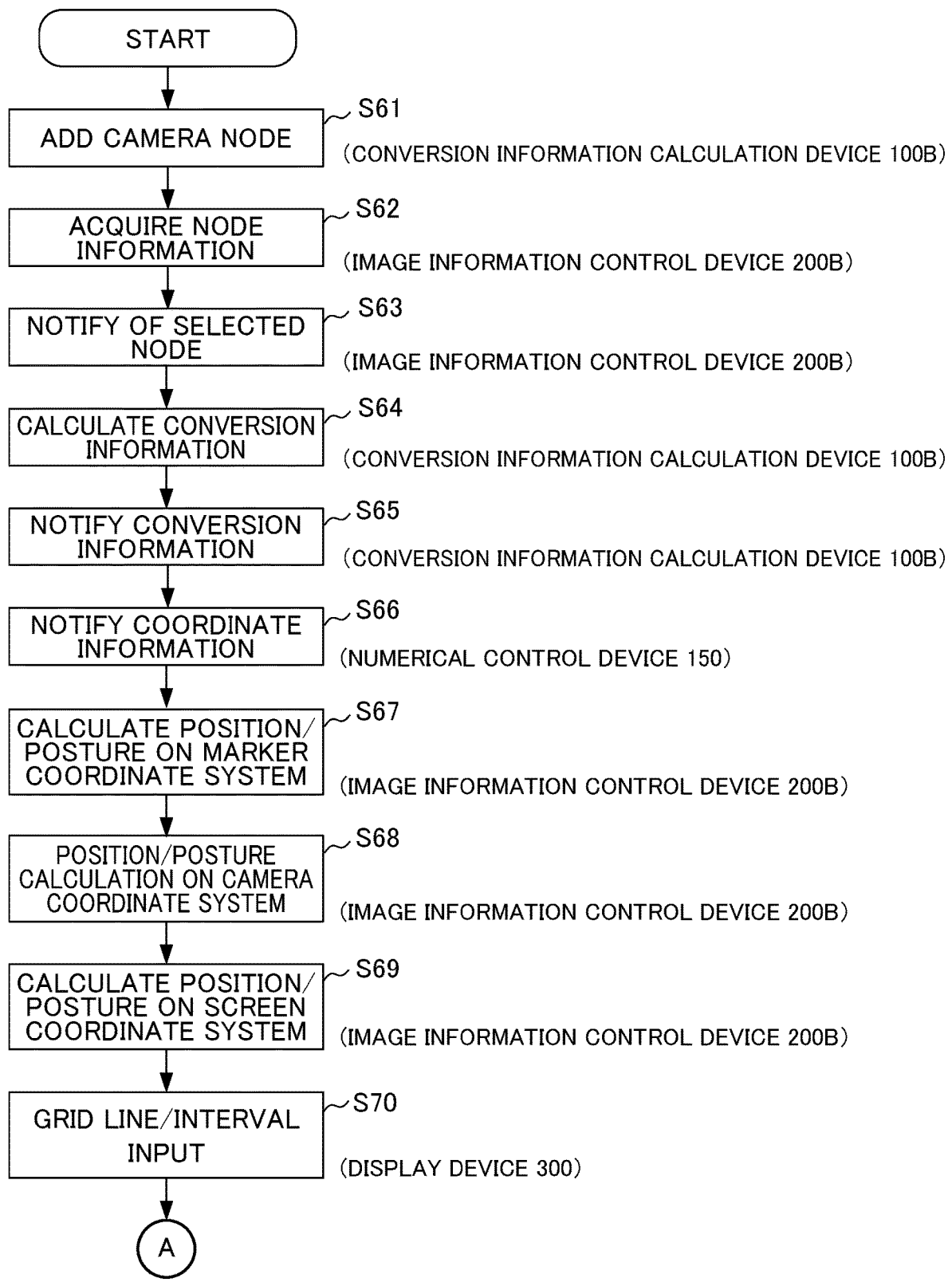
FIG. 27A is a view showing operation flow of a positional information display method according to the third embodiment of the present invention.
Figure 27B:
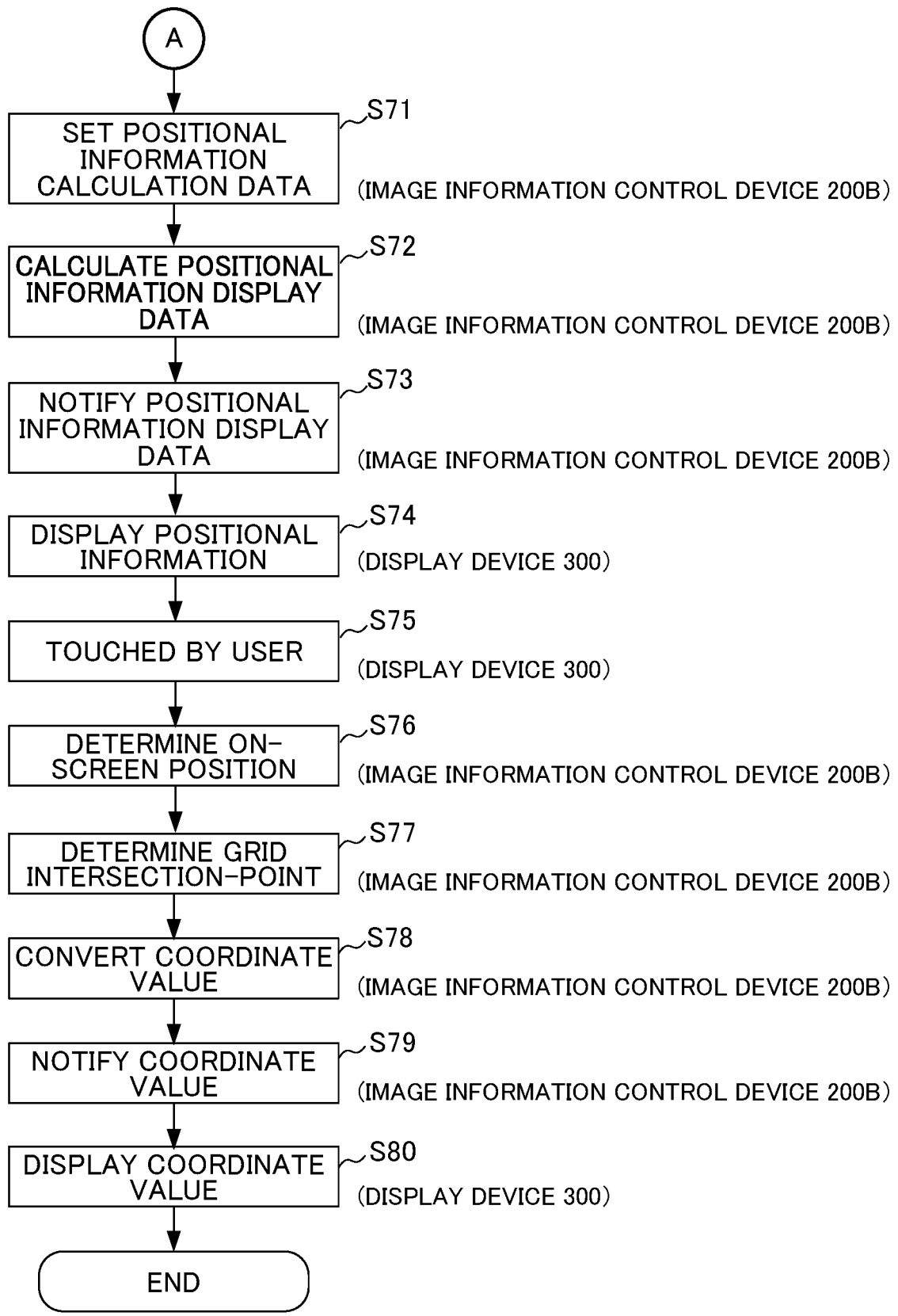
FIG. 27B is a view showing operation flow of a positional information display method according to the third embodiment of the present invention.
Figure 28:
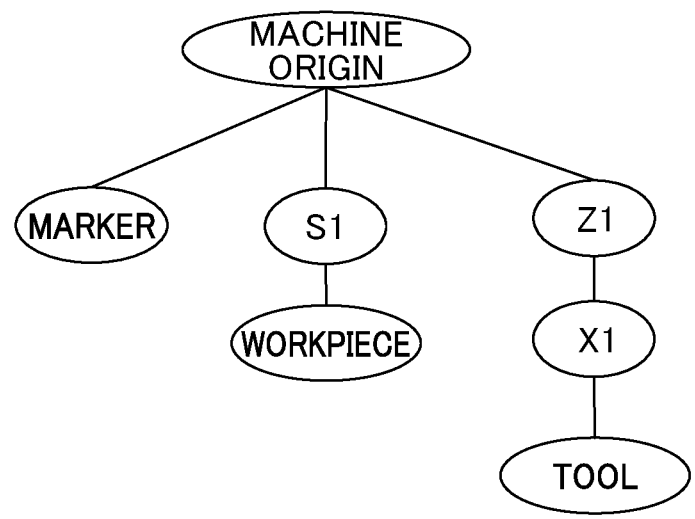
FIG. 28 is a view showing an example of a machine configuration tree including a marker node according to the third embodiment of the present invention.

FIGS. 27A and 27B show operation flow upon displaying the positional information including the coordinate system and grid. First, a summary of each step will be mentioned.

In Step S61, the conversion information calculation device 100B (node addition portion 116) adds a marker node as a new node to the machine configuration tree, as shown in FIG. 26.

In Step S62, the image information control device 200B (control unit 210B) acquires information of nodes which can be selected as a coordinate system from the conversion information calculation device 100B.

In Step S63, the image information control device 200B (node selection portion 219) selects the node corresponding to the coordinate system displaying the positional information, and the image information control device 200B (selected node notification portion 220) notifies of the selected node to the conversion information calculation device 100B.

In Step S64, the conversion information calculation device 100B (conversion information calculation portion 111B) calculates the conversion information obtaining the position and/or posture of positional information on the marker coordinate system, with the coordinate value of each axis of the machine tool 400 as variables.

In Step S65, the conversion information calculation device 100B (conversion information notification portion 112) notifies the conversion information calculated by the conversion information calculation device 100B (conversion information calculation portion 111B) to the image information control device 200 (coordinate information conversion portion 211B).

In Step S66, the numerical control device 150 (coordinate information notification portion 161) notifies the coordinate information of the machine tool 400 in operation to the image information control device 200B (coordinate information conversion portion 211B) in real time. Although it is shown in FIG. 25 that this notification is only executed one time, it may be executed periodically.

In Step S67, the image information control device 200B (coordinate information conversion portion 211B) calculates the position and/or posture in the marker coordinate system of the positional information including the coordinate system and grid, from the conversion information received from the conversion information calculation device 100B and the coordinate value of each control axis which is periodically notified from the numerical control device 150.

In Step S68, the image information control device 200B (positional information calculation data setting portion 212) obtains the position and/or posture in the camera coordinate system by conversion of the coordinate system, from the position and/or posture on the marker coordinate system.

In Step S69, the image information control device 200B (positional information calculation data setting portion 212) obtains the position and/or posture on the screen coordinate system by way of conversion of the coordinate system, from the position and/or posture on the camera coordinate system.

In Step S70, the operator selects a line of the grid to be displayed from the touch panel of the display device 300, and inputs the interval of the grid lines.

In Step S71, the image information control device 200B (positional information calculation data setting portion 212) sets the calculation data for visually displaying the position and/or posture of positional information including the coordinate system and grid on the screen coordinate system, by the touch panel serving as the screen surface of the display device 300.

In Step S72, the image information control device 200B (positional information display data calculation portion 213B) calculates the display data for displaying positional information which includes the coordinate information and grid to draw on the touch panel serving as the screen surface of the display device 300.

In Step S73, the image information control device 200B (positional information display data notification portion 214) notifies of the display data for displaying the positional information including the coordinate system and grid to the display device 300.

In Step S74, the display device 300 displays the positional information including the coordinate system and grid.

In Step S75, the operator touches an arbitrary point on the touch panel equipped to the display device 300.

In Step S76, the image information control device 200 (on-screen position determination portion 215) determines the position touched by the operator on the touch panel of the display device 300.

In Step S77, the image information control device 200 (grid intersection-point determination portion 216) determines, among the intersection points of the grid included in the positional information displayed on the touch panel serving as the screen surface of the display device 300, the intersection point closest to the position touched by the operator, on the touch panel of the display device 300.

In Step S78, the image information control device 200 (coordinate value conversion portion 217) calculates the coordinate value on the workpiece coordinate system of the intersection point determined by the grid intersection point determination portion 216.

In Step S79, the image information control device 200 (coordinate value notification portion 218) notifies of the coordinate value calculated by the image information control device 200 (coordinate value conversion portion 217) to the numerical control device 150 and display device 300.

In Step S80, the display device 300 displays that the intersection point closest to the position touched by the operator on the grid displayed on the touch panel serving as the screen surface of the display device 300 has the above-mentioned coordinate value.

It should be noted that the sequence of the above-mentioned Steps S61 to S80 can be appropriately switched as needed.

In addition, the position/posture in the marker coordinate system of the node displaying the positional information may be obtained by the conversion information calculation device 100B, and the values indicating the position/posture itself may be notified to the image information control device 200B.

In the above Steps S68 and S69, the image information control device 200B obtains the position/posture in the camera coordinate system from the position/posture in the marker coordinate system using a known method such as the method disclosed in Non-patent Document 1, and obtains the position/posture in the screen coordinate system from the position/posture in the camera coordinate system. More specifically, processing is performed to detect the three-dimensional position of the marker serving as the reference coordinates of the positional information display including the coordinate system and grid from the image information obtained by the camera 410, and to obtain the conversion information from the marker coordinate system to the camera coordinate system. According to this conversion information, the position/posture of the positional information including the coordinate system and grid is converted from the marker coordinate system to values of the camera coordinate system. Furthermore, processing to obtain conversion information from the camera conversion system to screen coordinate system is performed, and according to this conversion information, the position/posture of the positional information including the coordinate system and grid is converted from the camera coordinate system to values of the screen coordinate system. The positional information display data, in addition to the position/posture of the obtained camera coordinate system and screen coordinate system, includes data such as the form of positional information including the coordinate system and grid. The positional information display data is outputted to the display device 300, and using the outputted data, the display device 300 becomes able to draw the positional information including the coordinate system and grid at the appropriate position.

Figure 29:
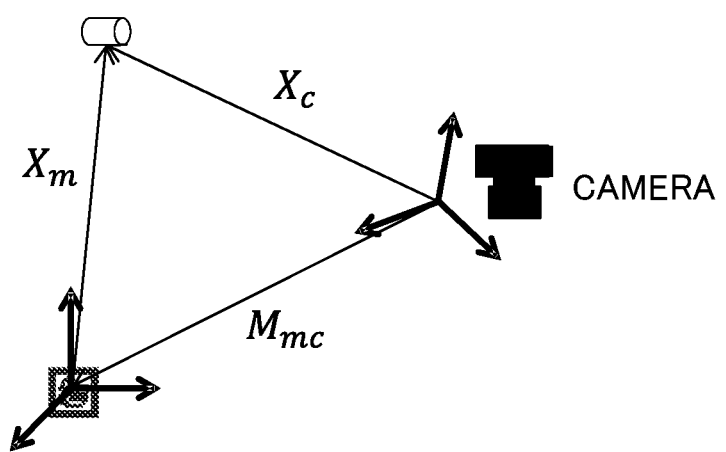
FIG. 29 is a view showing a relationship between marker coordinate system, camera coordinate system and conversion information.

It should be noted that, as shown in FIG. 29, when defining the position-posture matrix on the marker coordinate system as $X_m$, the position-posture matrix in the camera coordinate system as $X_c$, and the conversion matrix from the marker coordinate system to the camera coordinate system as $M_{mc}$, it becomes as follows.

$$X_c = M_{mc} X_m \qquad \text{[Math. 9]}$$

According to the above-mentioned method, since it is possible to obtain the position-posture matrix Xc of positional information including the coordinate system and grid in the camera coordinate system, it is possible to display the positional information including the coordinate system and grid at an arbitrary node on the display.

3.6 Effects Exerted by Third Embodiment

In the positional information display system 10B according to the third embodiment, the conversion information calculation device 100B generates the machine configuration tree constituted by nodes corresponding to the machine configuration of an industrial machine, and adds the node of a marker to this machine configuration tree. By including the marker as a node on the machine configuration tree, the position/posture in the marker coordinate system are known for all nodes on the machine configuration tree. The position/posture of marker coordinate in the camera coordinate system is thereby first recognized, then the position and/or posture of the workpiece coordinate system is obtained for the marker coordinate system from the machine configuration tree, and finally the position and/or posture of the workpiece coordinate system is known for the camera coordinate system; therefore, it becomes possible to draw the coordinate system and grid on the touch panel serving as the screen surface. By indexing the workpiece coordinate system position from the grid intersection point displayed by this method, and notifying to the numerical control device 150, it is possible to realize the same functions as the positional information display system 10A according to the second embodiment, even when using the camera 410 which is not fixed to the machine tool 400.

4 Modified Examples 4.1 Modified Example 1

Although the numerical control device 150 controls the machine tool 400 in the positional information display system 10 to 10B according to the first to third embodiments, it is not to be limited thereto. For example, it may be made a configuration that includes an industrial machine such as a robot in place of the machine tool 400, and controls the industrial machine such as the robot by a control device in place of the numerical control device 150.

4.2 Modified Example 2

Although the operator selects a line of the grid from the touch panel of the display device 300, and inputs the interval of the grid lines in the positional information display systems 10 to 10B according to the first to third embodiments, it is not to be limited thereto. For example, the interval of the grid lines may be automatically changed according to magnification/reduction of the screen of the display device 300. Alternatively, the grid lines displayed may be automatically changed according to the axis selected by a manual operation of the operator.

4.3 Modified Example 3

Although the display device 300 is made to display the grid lines as positional information in the positional information display systems 10 to 10B according to the first to third embodiments, it is not to be limited thereto. For example, the display device 300 may display dots forming a line at predetermined intervals in a two-dimensional plane may in place of the grid lines. In more detail, in the present modified example, the image information control devices 200 to 200B include: a dot interval designation portion 212c (not shown) which designates the interval of dots displayed on the display device 300 based on input from the touch panel, in place of the grid interval designation portion 212b; and a touched dot determination portion 216c (not shown) which determines a touched dot that is a dot closest to the position touched by the operator, among the dots included in the positional information, in place of the grid intersection-point determination portion 216, and the coordinate value conversion portion 217 can use dots in place of the grid lines by calculating the coordinate value in a first coordinate system of the touched dot.

4.4 Modified Example 4

Figure 30A:
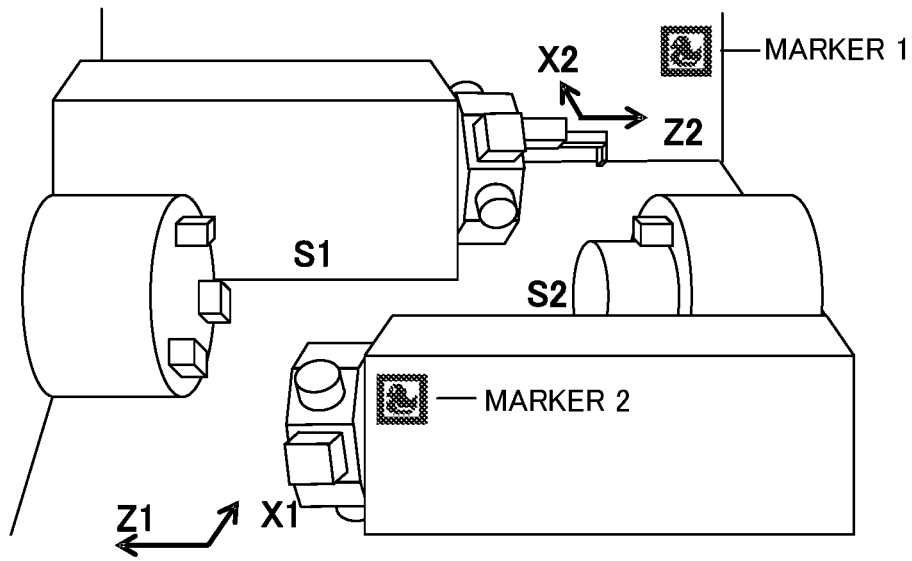
FIG. 30A is a view showing an example of an added position of a marker in the third embodiment of the present invention.
Figure 30B:
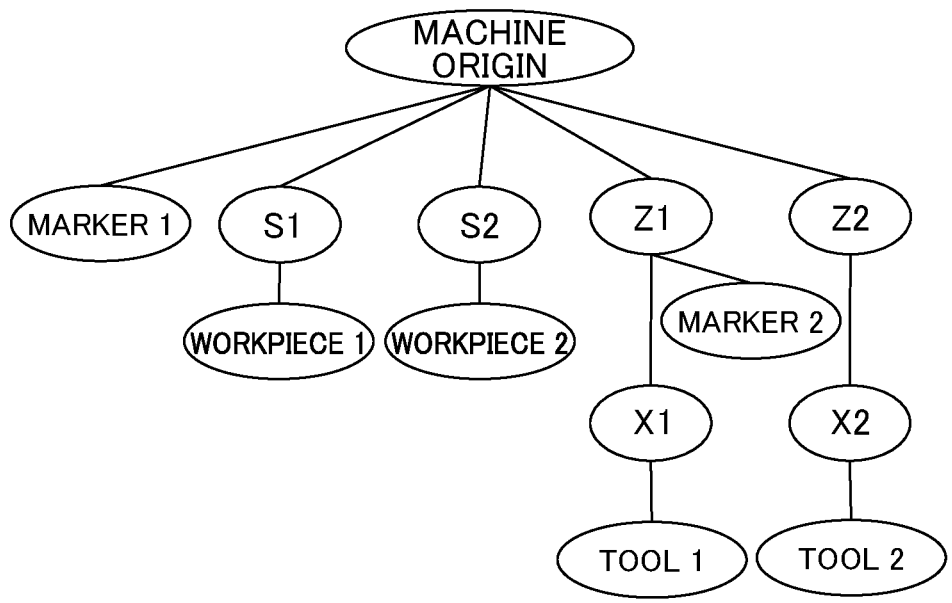
FIG. 30B is a view showing an example of a machine configuration tree to which a marker node was added in the third embodiment of the present invention.

In the positional information display system 10B according to the third embodiment, a case is considered in which the marker is found or not found according to the position of a viewpoint. Therefore, in order to prevent a case of the marker not being visible, a plurality of markers may be established on the machine tool 400 as shown in FIG. 30A, and a plurality of marker nodes may be established on a graph as shown in FIG. 30B. In this case, the position/posture of positional information including the coordinate system and grid can be calculated based on any available marker among the plurality of markers. In addition, it is possible to simultaneously use a plurality of markers, utilize an average value of the position/posture of each marker, and calculate the position/posture of positional information including the coordinate system Alternatively, for example, it is also possible to calculate the position/posture of positional information including the coordinate system and grid, by weighting the position/posture of each marker responsive to the distance from the viewpoint.

Figure 31A:
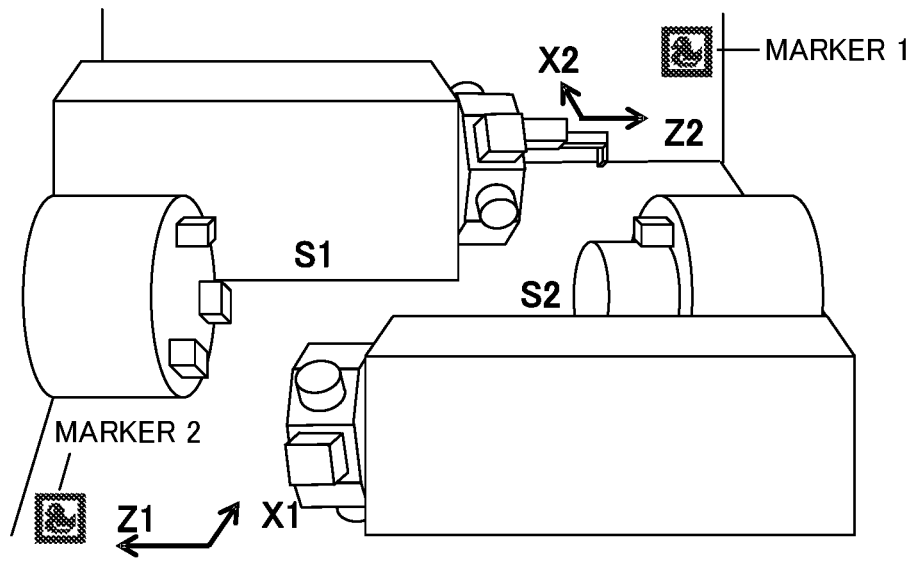
FIG. 31A is a view showing an example of an added position of a marker in the third embodiment of the present invention.
Figure 31B:
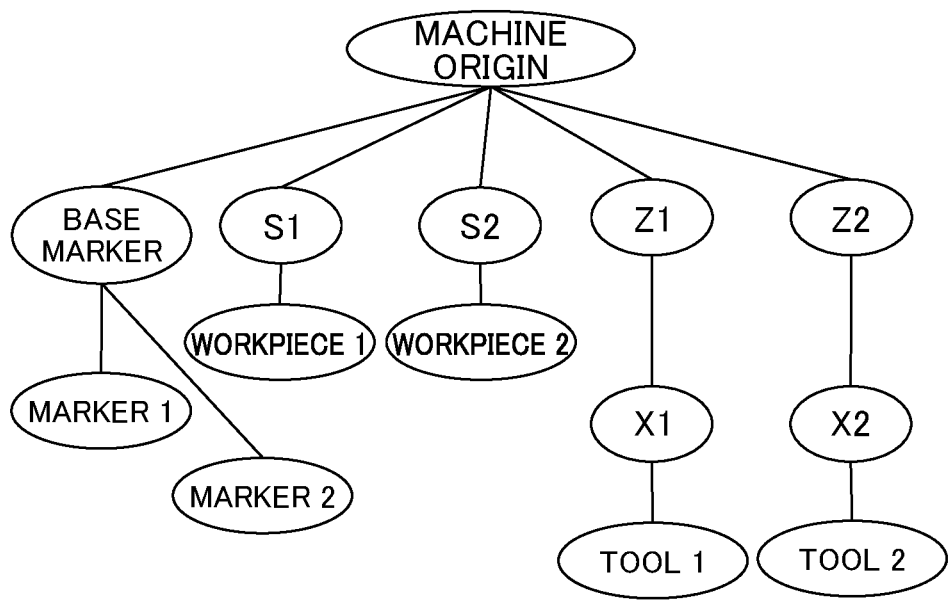
FIG. 31B is a view showing an example of a machine configuration tree to which a marker node was added in the third embodiment of the present invention.

Furthermore, as shown in FIG. 31A and FIG. 31B, it is possible to set a base marker node at an arbitrarily decided position, and register each marker node as the child of the base marker node. In this case, the conversion information calculation device 100B transmits conversion information of each positional information in the base marker coordinate system with the base marker as the origin, and conversion information from each marker coordinate system to the base marker coordinate system, to the image information control device 200B. The former conversion information does not change in the case of using any marker. The image information control device 200 obtains the position/posture of the base marker from the position/posture of each marker using the latter conversion information in accordance with a recognized marker, and further obtains conversion information from the base marker coordinate system to the camera coordinate system.

Figure 32:
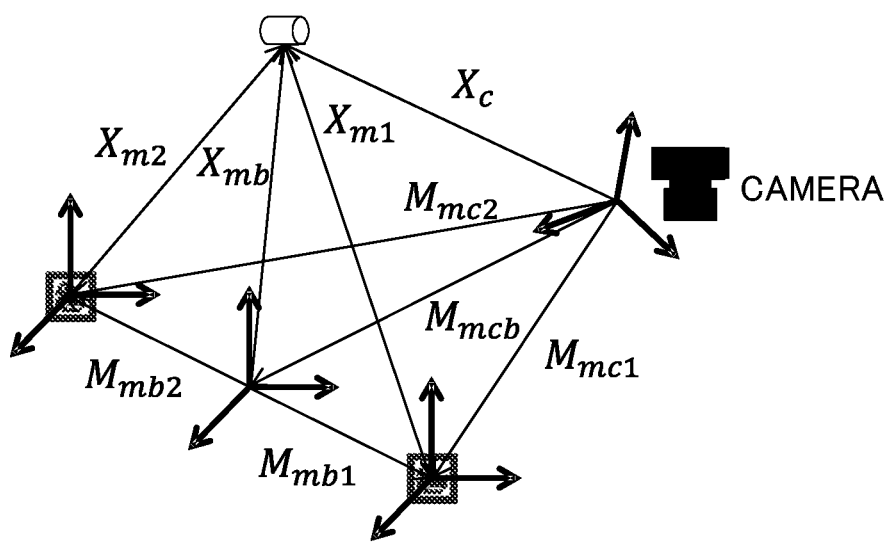
FIG. 32 is a view showing a relationship between a marker coordinate system, camera coordinate system and conversion information in the case of there being a plurality of marker coordinate systems.

Herein, as shown in FIG. 32, the position-posture matrix in the camera coordinate system is defined as $X_c$, the position-posture matrix in the marker coordinate system 1 is defined as $X_{m1}$, the position-posture matrix in the marker coordinate system 2 is defined as $X_{m2}$, and the position-posture matrix in the base marker coordinate system is defined as $X_{mb}$. In addition, the conversion matrix from the base marker coordinate system to the camera coordinate system is defined as $M_{mcb}$, the conversion matrix from the marker coordinate system 1 to the camera coordinate system is defined as $M_{mc1}$, the conversion matrix from the marker coordinate system 2 to the camera coordinate system is defined as $M_{mc2}$, the conversion matrix from the marker coordinate system 1 to the base marker coordinate system is defined as $M_{mb1}$, and the conversion matrix from the marker coordinate system 2 to the base marker coordinate system is defined as $M_{mb2}$. In this case, the following formula holds true.

$$X_c = M_{mcb} X_{mb}$$

$$M_{mcb} = k M_{mc1} M_{mb1}^{-1} + (1-k) M_{mc2} M_{mb2}^{-1}$$

$$X_{mb} = k M_{mb1} X_{m1} + (1-k) M_{mb2} X_{m2} \qquad \text{[Math. 10]}$$

It should be noted that k is a coefficient deciding the weight of a marker, for example, and in the case of using both markers, assumes a value of 0.5, in the case of using marker 1, assumes a value of 1, and in the case of using only marker 2, assumes a value of 0. Processing to handle a plurality of markers is gathered into processing of obtaining the position/posture of the base marker node, and processing of obtaining conversion information from the base marker node coordinate system to the camera coordinate system, and otherwise, handling of a plurality of markers becomes easy by making the same processing as the case of using a single marker.

4.5 Modified Example 5

The graph data may be stored in a storage unit (not shown) of the conversion information calculation device 100A and 100B; however, it is not limited thereto. For example, it may be stored in the image information control device 200A or 200B, or may be stored on a server which connects with the positional information display system 10A or 10B via a network. Application of the present invention is possible also to old machine tools, by configuring so as to be able to store the machine configuration tree data on the image information control device 200A or 200B, and a server. It should be noted that, in this case, Step S44 and Step S54 are executed on the image information control device 200A or 200B side, without the processing up to the above Step S41 to S43, and processing up to Step S51 to S53 being executed.

4.6 Modified Example 6

In addition, the conversion information calculation device 100 to 100B may be integrated by combining with the numerical control device 150. Alternatively, the conversion information calculation devices 100 to 100B may exist on a cloud.

It should be noted that each of the above-mentioned conversion information calculation device, numerical control device, extended information control device, and machine tool can be realized by hardware, software, or a combination of these. In addition, the simulation method performed by cooperation of the above-mentioned conversion information calculation device, numerical control device, extended information control device and machine tool also can be realized by hardware, software, or a combination of these. Herein, being realized by software indicates being realized by a computer reading and executing a program.

The program can be stored using various types of non-transitory computer readable media, and supplies to the computer. Non-transitory computer readable medium includes various types of tangible storage media. Examples of non-transitory computer readable media include magnetic recording media (e.g., flexible disk, magnetic tape, hard disk drive), magneto-optical recording media (e.g., magneto-optical disk), CD-ROM (Read Only Memory), CD-R, CD-R/W and semiconductor memory (e.g., mask ROM, PROM (programmable ROM), EPROM (Erasable PROM), flash ROM, RAM (random access memory)). In addition, the program may be supplied to the computer by way of various types of transitory computer readable media. Examples of transitory computer readable media include electrical signals, optical signals and electromagnetic waves. Transitory computer readable media can supply programs to the computer via wired communication paths such as electric wires and optical fiber, or wireless communication paths.

EXPLANATION OF REFERENCE NUMERALS 10, 10A, 10B positional information display system
111 conversion information calculation portion
112 conversion information notification portion
113 graph generation portion
114 control point coordinate system insertion portion
150 numerical control device
161 coordinate information notification portion
200 image information control device
211 coordinate information conversion portion
212 positional information calculation data setting portion
212a grid line designation portion
212b grid interval designation portion
213 positional information display data calculation portion
214 positional information display data notification portion
215 on-screen position determination portion
216 grid intersection-point determination portion
217 coordinate value conversion portion
218 coordinate value notification portion
219 node selection portion
220 selected node notification portion
300 display device
400 machine tool

What is claimed is:

1. A positional information display system comprising a control device of an industrial machine, a conversion information calculation device which calculates conversion information between different coordinate systems, and an image information control device which causes positional information to be displayed on a display device having a touch panel,
wherein the control device includes:
a coordinate information notification portion which notifies of coordinate values of each axis of the industrial machine to the image information control device;
wherein the conversion information calculation device includes:
a conversion information calculation portion which calculates conversion information representing a position and/or posture of a first coordinate system in a second coordinate system, with coordinate values of each axis of the industrial machine as variables,
a conversion information notification portion which notifies the conversion information to the image information control device,
a graph generation portion which generates a graph constituted by nodes showing a machine configuration of the industrial machine,
a control point coordinate system insertion portion which inserts a control point and coordinate system into the graph, and
a node information notification portion which notifies of node information which can be selected as a coordinate system to the image information control device;
wherein the image information control device includes:
a coordinate information conversion portion which calculates a position and/or posture of the first coordinate system in the second coordinate system using the conversion information and the coordinate value of each axis,
a positional information calculation data setting portion which sets data for calculation of positional information for visually displaying on the touch panel a position and/or posture of the first coordinate system in a third coordinate system of the display device,
a positional information display data calculation portion which calculates data for display of the positional information on the display device using the data for calculation of the positional information,
a positional information display data notification portion which notifies of the data for display of the positional information to the display device,
a node selection portion which selects a node corresponding to the coordinate system displayed, and
a selected node notification portion which notifies of a selected node to the conversion information calculation portion of the conversion information calculation device; and
wherein the conversion information calculation portion calculates conversion information which represents the position and/or posture in a coordinate system corresponding to a selected node.

2. The positional information display system according to claim 1,
wherein the positional information includes a grid,
wherein the positional information calculation data setting portion includes:

a grid line designation portion which designates lines of the grid displayed on the display device based on input from the touch panel, and a grid interval designation portion which designates an interval of the grid displayed on the display device based on input from the touch panel, and wherein the positional information calculation data setting portion sets, as data for calculating the positional information, a line designated by the grid line designation portion, and an interval designated by the grid interval designation portion.

3. The positional information display system according to claim 2, wherein the image information control device includes:

an on-screen position determination portion which determines a position touched by an operator on the touch panel;

a grid intersection-point determination portion which determines, among intersection points of a grid included in the positional information, an intersection point closest to the position touched by the operator on the touch panel;

a coordinate value conversion portion which calculates a coordinate value in the first coordinate system of the intersection point; and a coordinate value notification portion which notifies the coordinate value to the control device.

4. The positional information display system according to claim 1, wherein the positional information includes dots, wherein the positional information calculation data setting portion includes a dot interval designation portion which designates an interval of the dots displayed on the display device based on input from the touch panel, and wherein the positional information calculation data setting portion sets, as data for calculating the positional information, an interval designated by the dot interval designation portion.

5. The positional information display system according to claim 4, wherein the image information control device includes:

an on-screen position determination portion which determines a position touched by an operator on the touch panel;

a touched dot determination portion which determines, among dots included in the positional information, a touched dot which is a dot closest to the position touched by the operator;

a coordinate value conversion portion which calculates a coordinate value in the first coordinate system of the touched dot; and a coordinate value notification portion which notifies of the coordinate value to the control device.

6. The positional information display system according to claim 3, wherein the coordinate value notification portion notifies of the coordinate value to the display device, and wherein the display device displays a notified coordinate value.

7. The positional information display system according to claim 1, wherein a node corresponding to a camera is included in a graph generated by the graph generation portion, and wherein the conversion information includes a coordinate value of a control axis node on a pathway of the graph from the node corresponding to the camera to a node of a display target, as a variable, and is conversion information calculating a position and/or posture of each node of the display target on the camera coordinate system based on the graph.

8. The positional information display system according to claim 1, wherein a node corresponding to a marker is included in a graph generated by the graph generation portion, and wherein the conversion information includes a coordinate value of a control axis node on a pathway of the graph from a node corresponding to a marker to a node of the display target as a variable, and is conversion information calculating a position and/or posture of each node of the display target on the marker coordinate system, based on the graph.

* * * * *